(12) United States Patent
Chao

(10) Patent No.: US 10,480,561 B2
(45) Date of Patent: Nov. 19, 2019

(54) SCREW CHIP REMOVAL STRUCTURE

(71) Applicant: Ying-Chin Chao, Kaohsiung (TW)

(72) Inventor: Ying-Chin Chao, Kaohsiung (TW)

( * ) Notice: Subject to any disclaimer, the term of this patent is extended or adjusted under 35 U.S.C. 154(b) by 215 days.

(21) Appl. No.: 15/673,434

(22) Filed: Aug. 10, 2017

(65) Prior Publication Data
US 2018/0231046 A1    Aug. 16, 2018

(30) Foreign Application Priority Data

Feb. 16, 2017    (TW) .............................. 106105064 A

(51) Int. Cl.
*F16B 25/10*    (2006.01)
*F16B 25/00*    (2006.01)

(52) U.S. Cl.
CPC ........ *F16B 25/103* (2013.01); *F16B 25/0015* (2013.01); *F16B 25/0084* (2013.01); *F16B 25/10* (2013.01)

(58) Field of Classification Search
CPC .............. F16B 25/0015; F16B 25/0021; F16B 25/0084; F16B 25/103; F16B 25/10
USPC ............. 411/386, 387.1, 387.6, 387.7, 387.8
See application file for complete search history.

(56) References Cited

U.S. PATENT DOCUMENTS

| | | | |
|---|---|---|---|
| 2,156,350 A * | 5/1939 | Olson ................. | F16B 25/0015 411/420 |
| 2,165,011 A * | 7/1939 | Rosenberg ............. | B21H 3/027 411/420 |
| 2,232,336 A * | 2/1941 | Meersteiner ........... | B21H 3/027 408/219 |
| 2,232,337 A * | 2/1941 | Meersteiner ........... | B21H 3/027 411/420 |
| 2,278,411 A * | 4/1942 | Braendel ............. | F16B 25/0021 411/386 |
| 2,293,930 A * | 8/1942 | Braendel ................ | B21H 3/027 411/420 |
| 2,302,675 A * | 11/1942 | Cherry ................... | B21H 3/027 411/421 |
| 6,106,208 A * | 8/2000 | Lin ..................... | F16B 25/0015 411/386 |
| 8,511,958 B2 * | 8/2013 | Chang ................... | F16B 25/103 411/387.1 |
| 2013/0309042 A1 * | 11/2013 | Chao .................... | F16B 25/0015 411/387.1 |
| 2014/0023455 A1 * | 1/2014 | Park .................... | F16B 25/0015 411/387.7 |

* cited by examiner

*Primary Examiner* — Roberta S Delisle
(74) *Attorney, Agent, or Firm* — Leong C. Lei

(57) ABSTRACT

Disclosed is a chip removal structure of a screw. The screw includes a screw head. A shank extends downward from the screw head. The shank has an outer circumferential surface on which a thread is formed in a surrounding form. The shank has a lower end that is formed with a tapering tail section. The thread is extended to the tapering tail section. The tapering tail section is formed, through cutting or pressing, with two or more chip removal grooves. The spacing distance of the chip removal grooves can be adjusted as desired. The chip removal grooves are set at an inclination angle and any one of the chip removal grooves may exceed or may not exceed a screw center line. The chip removal grooves on the left side are each 0.5 to 4.5 times in width of the chip removal grooves on the right side.

14 Claims, 32 Drawing Sheets

PRIR ART

SCREW CHIP REMOVAL STRUCTURE

TECHNICAL FIELD OF THE INVENTION

The present invention relates generally to a chip removal structure of a screw, and more particularly to a screw chip removal structure that improves chip removal capability of a screw and also help reduces the magnitude of torque required for a screwing operation of the screw to thereby achieve an effect of saving labor and time for the operation, and also to help prevent cracking of wood to enhance quality of an operation conducted with the screw.

DESCRIPTION OF THE PRIOR ART

Wood screws are generally used in wooden work pieces for connection. The wood screws have a capability of drilling a hole in a wood material and at the same tapping the hole so as to allow for quick connection of the wooden work pieces.

A conventional screw is show in FIG. 1 and designated at 1, comprising a screw head 11 and a shank 12 extending downward from the screw head 11. The shank 12 has an outer circumferential surface on which an external thread 13 is formed in a spirally surrounding form. A lower end of the shank 12 forms a tapering tail section 14. To help reduce cracking of a wooden work piece due to the screw being screwed therein, the tapering tail section 14 is formed with a V-shaped chip removal groove 15, which extends along a center lines A and takes an angular area of around 90 degrees that are a quarter of a cross sectional surface of the screw shank.

To conduct a fastening operation with the screw, the tapering tail section 14 is first pressed against a surface of a wooden work piece and then a power tool is used to apply a torque to the screw head 11 to drive the screw 1 to rotate such that the tapering tail section 14 is driven into the wooden work piece through drilling and cutting into the material of the work piece. However, during the operation of drilling and cutting into and thus screwing into the wooden work piece with the conventional screw 1, due to being of a small size, the V-shaped chip removal groove 15 of the conventional screw 1 is generally of a poor performance in removing wood chips. The great pressure induced by the shank of the screw being screwed into the work piece would be transmitted, by way of the external thread 13 and the shank 12, to and applied to the wooden work piece to cause swelling and stress concentration. This readily results in cracking of the wooden work piece due to the excessive pressure and the structural strength of the wooden work piece and the effect of the fastening achieved with the screw would get deteriorated. Particularly, when cracking shows up in a surface of the wooden work piece, the integrity of the wooden work piece and product safety are severely affected. Further, fastening the screw 1 requires an excessively large torque and this often causes injury of the body of an operator, such as the wrist. Thus, the design of the chip removal groove 15 of the screw 1 is of vital importance. Speaking straightforward, the design of the chip removal groove 15 of the screw 1 is vital for connection of wooden work piece.

Thus, it is a challenge of the screw manufacturers to provide a structure of a chip removal groove 15 of a screw 1 that effectively protects a wooden work piece from cracking during an operation that the screw 1 is screwed, through drilling and cutting, into the wooden work piece and reduces a friction-induced torque in screwing and thus help smoothly remove of wood chips.

SUMMARY OF THE INVENTION

The primary objective of the present invention is to provide a solution that overcomes the shortcomings of the prior art that a wooden work piece may readily crack, due to excessive pressure applied thereto caused by the prior art screw, so as to damage the structural strength of the wooden work piece and a fastening effect desired to be achieved with the screw.

The technical solution adopted in the present invention to achieve the above objective is a chip removal structure of a screw. The screw comprises a screw head. A shank extends downward from the screw head. The shank has an outer circumferential surface on which a thread is formed in a surrounding form. The shank has a lower end that is formed with a tapering tail section. The thread is extended to the tapering tail section. The tapering tail section is formed, through cutting or pressing, with two or more chip removal grooves.

Effectiveness that the present invention can achieve with the above technical solution is that the tapering tail section is provided with at least two or more chip removal grooves having an inclination angle between 1°-179°. Any one of the two or more chip removal grooves may be arranged to exceed or not exceed a screw center line of the screw, wherein each of the chip removal grooves on the left side is 0.5 to 4.5 times in width of the right-side chip removal grooves so as to improve chip removal capability of the screw and also reduce screw-in torque of the screw to thereby achieve an effect of saving labor and time in conducting an operation, and further, with an arrangement of multiple chip removal grooves, the occurrence of defects of wood cracking is prevented to enhance the quality of an operation conducted with the screw.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
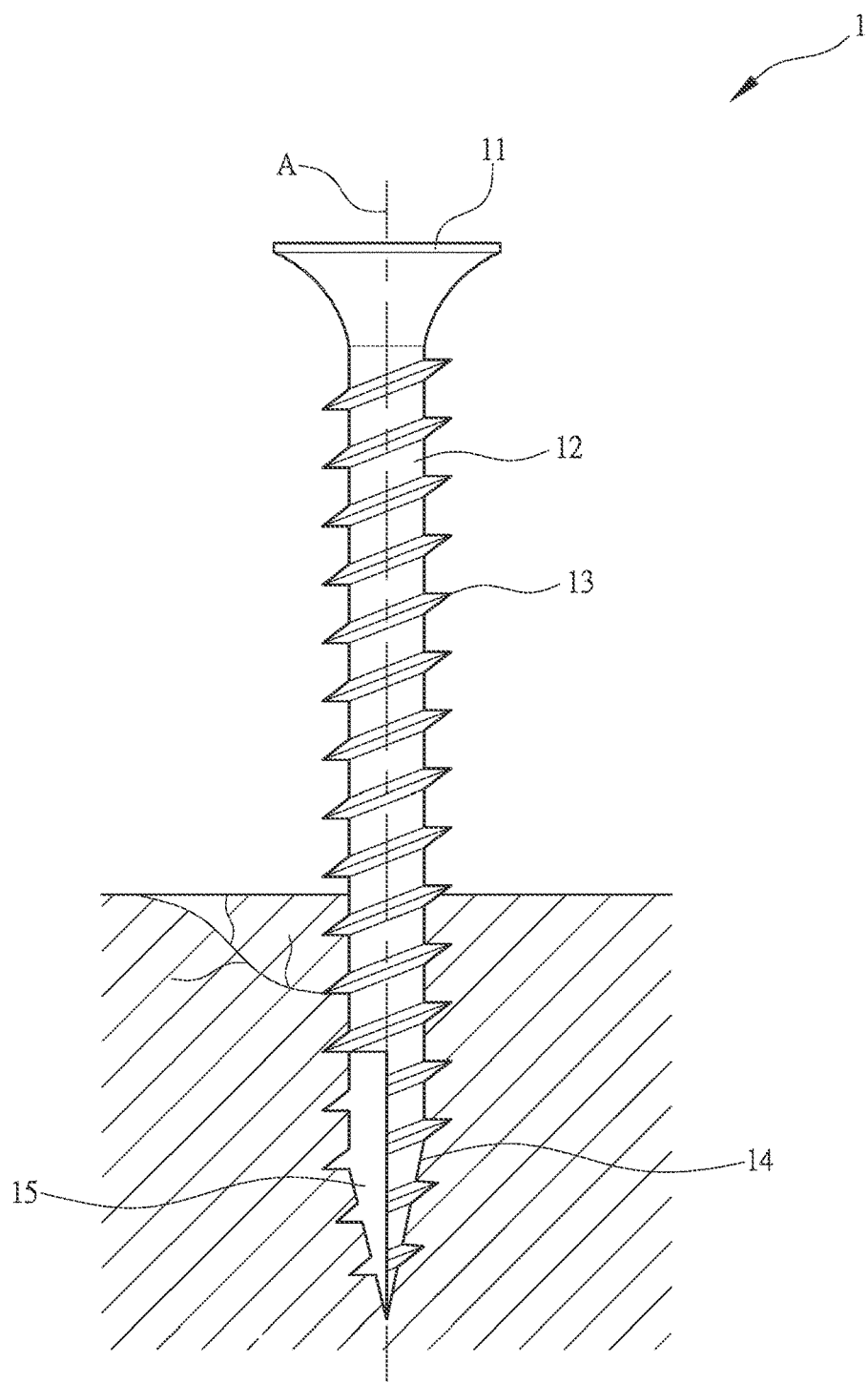
FIG. 1 is a perspective view of a conventional screw.
Figure 2:
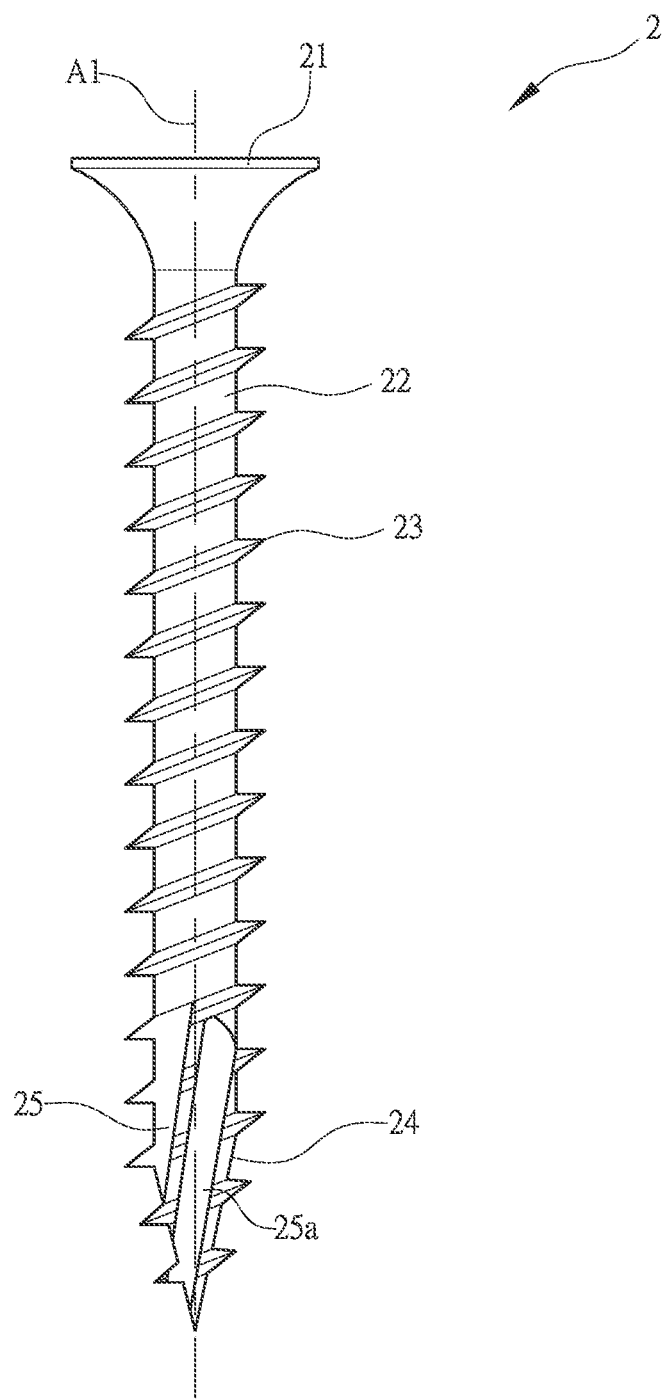
FIG. 2 is a perspective view of a screw according to the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 2, 3, 3A, 3B, and 3C, the present invention provides a screw 2 that has a tapering tail section (or sharp tip section) 24 that is formed, through cutting and pressing, with two or more chip removal grooves 25. The chip removal grooves 25 may be arranged at an inclination angle in a leftward-oriented manner (reverse handedness, which is opposite to a thread 23) or in a rightward-oriented manner (forward handedness, which is the same direction as the thread 23) (where the left hand side part of the drawing sheet is taken as the left hand side, while the right hand side port of the drawings sheet is the right hand side, this being similarly applicable hereinafter), the chip removal grooves 25 may or may not comprise portions of the thread 23 and a shank 22. In the drawing, an arrangement involving two chip removal grooves 25 is taken as an example for describing this invention, but the number of the chip removal grooves 25 of the present invention is not limited thereto. At least one of the two or more chip removal grooves 25 exceeds a screw center line A1 of the screw 2 to form an over-center-line chip removal groove 25a, while the other one does not. With the rightmost one of the two or more chip removal grooves 25 being the over-center-line chip removal groove 25a that extends over and exceeds the screw center line A1 of the screw 2, wherein each over-center-line chip removal groove 25a has an inclination angle between 1°-89°, wherein for a case of only two parallel chip removal grooves, as a preferred angular range for the present invention, each over-center-line chip removal groove 25a may have an inclination angle that is set as inclination of 13°-30° in a rightward direction with respect to the screw center line A1, the angle being determined according to a width of the over-center-line chip removal groove 25a associated therewith and for a case of more than three parallel chip removal grooves, a preferred angular range is 23°-45° and the angle is determined according to the width of the over-center-line chip removal groove 25a associated therewith, and each one of the over-center-line chip removal grooves 25a on the left side is 0.5 to 4.5 times in width of the rightmost over-center-line chip removal groove 25a to improve the chip removal capability of the screw 2 and also reduce screw-in torque of the screw 2 to thereby achieve an effect of saving labor and time in conducting an operation and also to prevent the occurrence of defects of wood cracking to enhance the quality of an operation conducted with the screw 2.

Figure 3:
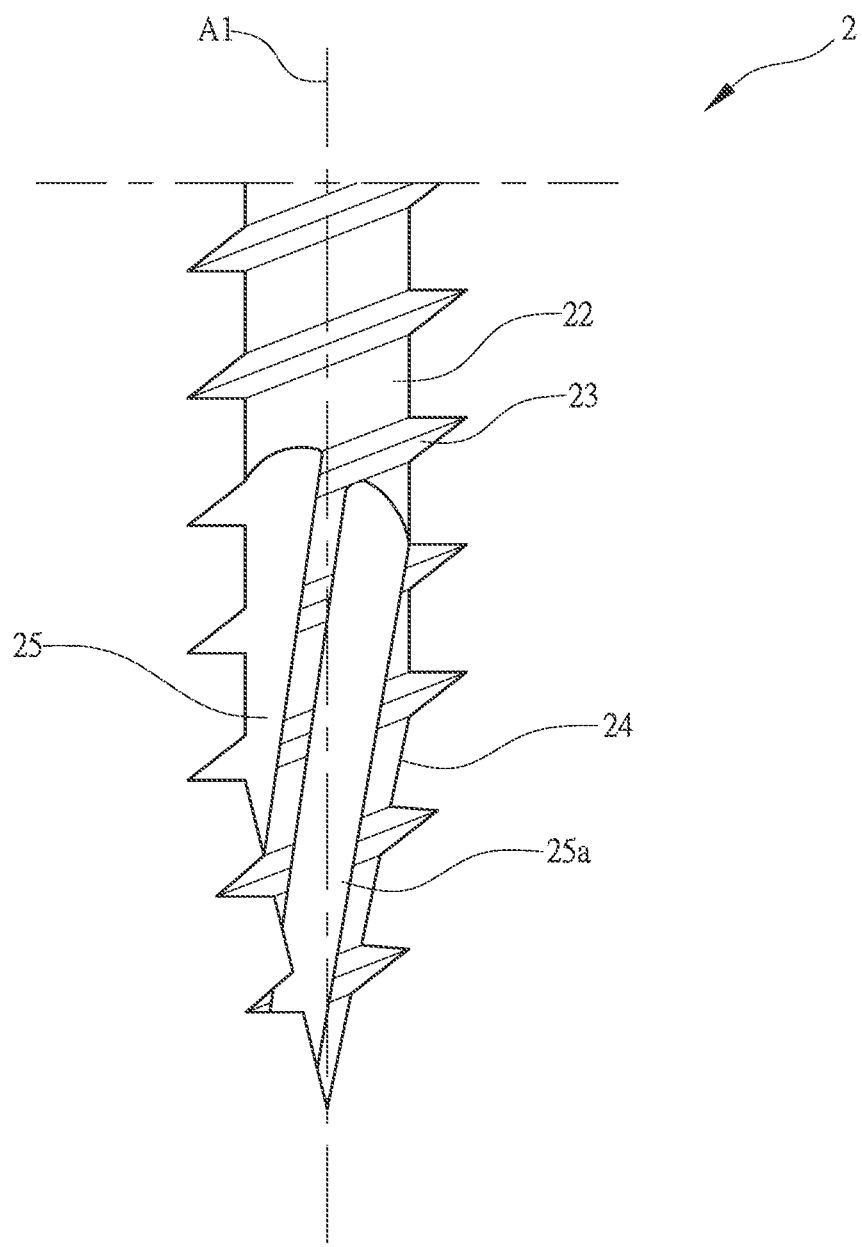
FIG. 3 is an enlarged view of a portion of FIG. 2.
Figure 3A:
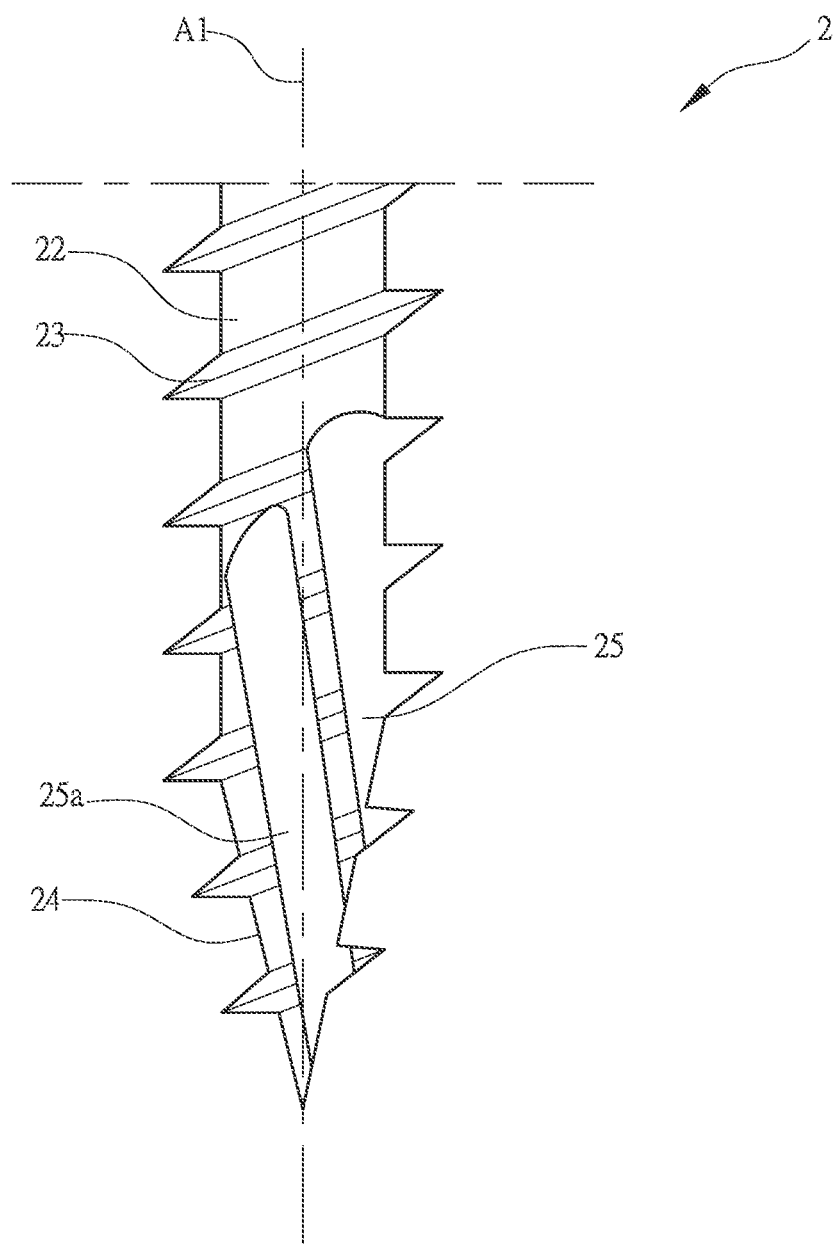
FIG. 3A is an embodiment having handedness opposite to that of FIG. 3

As shown in FIG. 3A, the tapering tail section 24 of the screw 2 is formed, through cutting or pressing, with two or more reverse over-center-line chip removal grooves 25a, each of the over-center-line chip removal grooves 25a has an inclination angle between 91°-179° (inclining at 1°-89° in a leftward direction with respect to the screw center line A1), and each one of the over-center-line chip removal grooves 25a on the right side is 0.5 to 4.5 times in width of the leftmost over-center-line chip removal groove 25a.

Figure 3B:
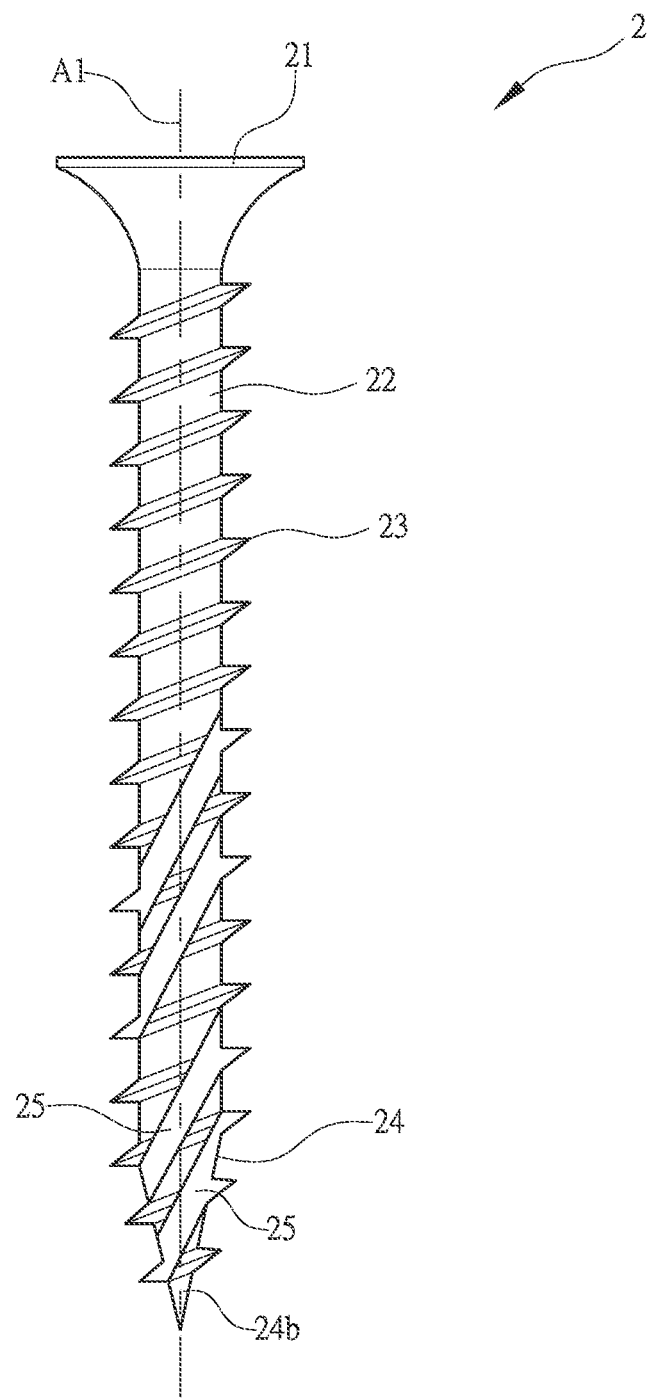
FIG. 3B is another embodiment of FIG. 3.
Figure 3C:
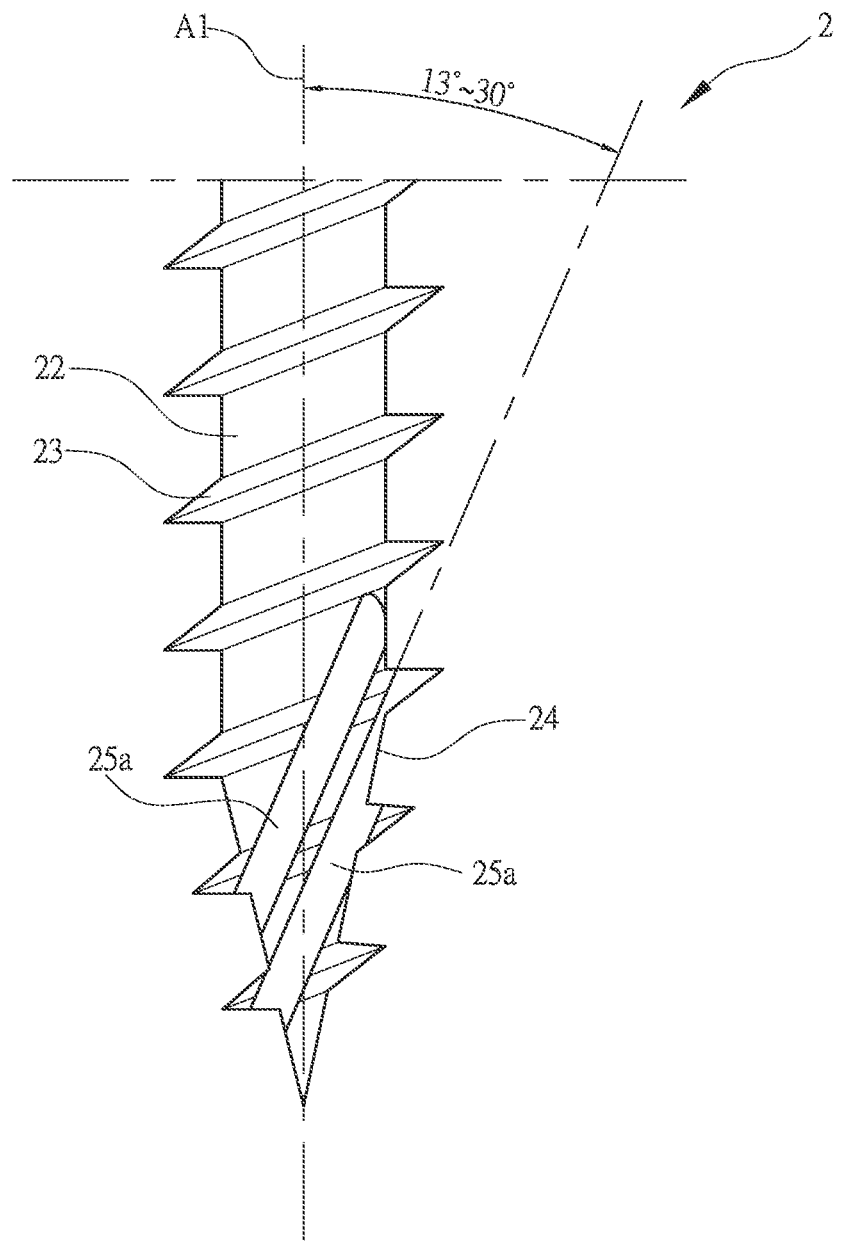
FIG. 3C is a further embodiment of FIG. 3.

As shown in FIGS. 3B and 3C, FIG. 3B shows an embodiment in which a cutting tip section 24b of the tapering tail section 24 is provided, on a single side or double sides thereof, with the chip removal grooves 25, and the chip removal grooves 25 is extended upward, as a straight line or helically, to any point on the thread 23. In the drawing, single chip removal groove 25 that is spiral and set in the same direction as the thread 23 is taken as an example for description of the present invention, but the number and direction of being forward or reverse of the chip removal grooves 25 of the present invention is not limited thereto. FIG. 3C provides an illustration of the preferred embodiment of FIG. 3. The rightmost one of the two or more chip removal grooves 25, which is the over-center-line chip removal groove 25a exceeding the screw center line A1 of the screw 2 and over-center-line chip removal groove 25a has an inclination angle between 1°-89°, wherein for a case of only two chip removal grooves, as a preferred angular range for the present invention, each over-center-line chip removal groove 25a may have an inclination angle that is set as inclination of 13°-30° in a rightward direction with respect to the screw center line A1, the angle being determined according to a width of the over-center-line chip removal groove 25a associated therewith. For a case of more than three parallel chip removal grooves, a preferred angular range is 23°-45°. Further, each one of the over-center-line chip removal grooves 25a on the left side is 0.5 to 4.5 times in width of the rightmost over-center-line chip removal groove 25a to improve the chip removal capability of the screw 2 and also reduce screw-in torque of the screw 2 to thereby achieve an effect of saving labor and time in conducting an operation and also to prevent the occurrence of defects of wood cracking to enhance the quality of an operation conducted with the screw 2.

Figure 4:
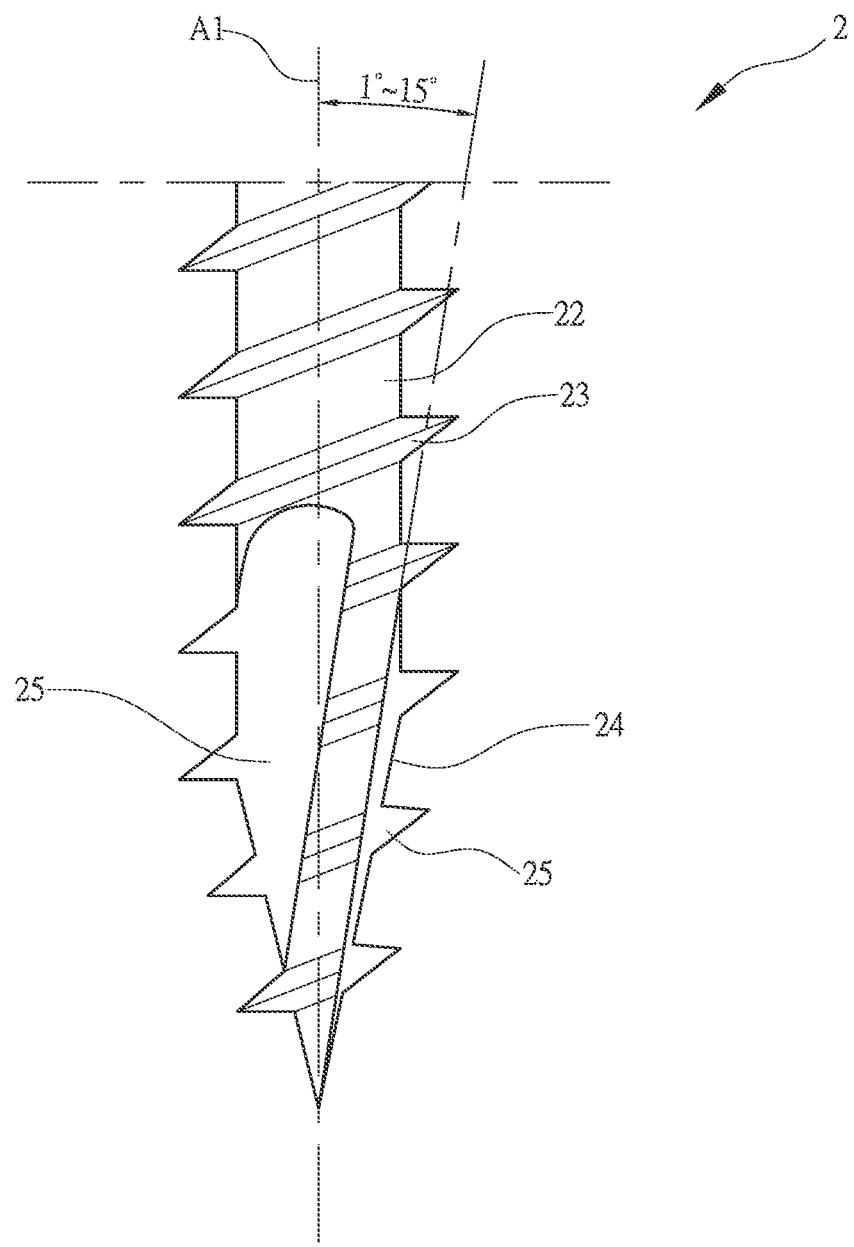
FIG. 4 is another embodiment of FIG. 2.
Figure 4A:
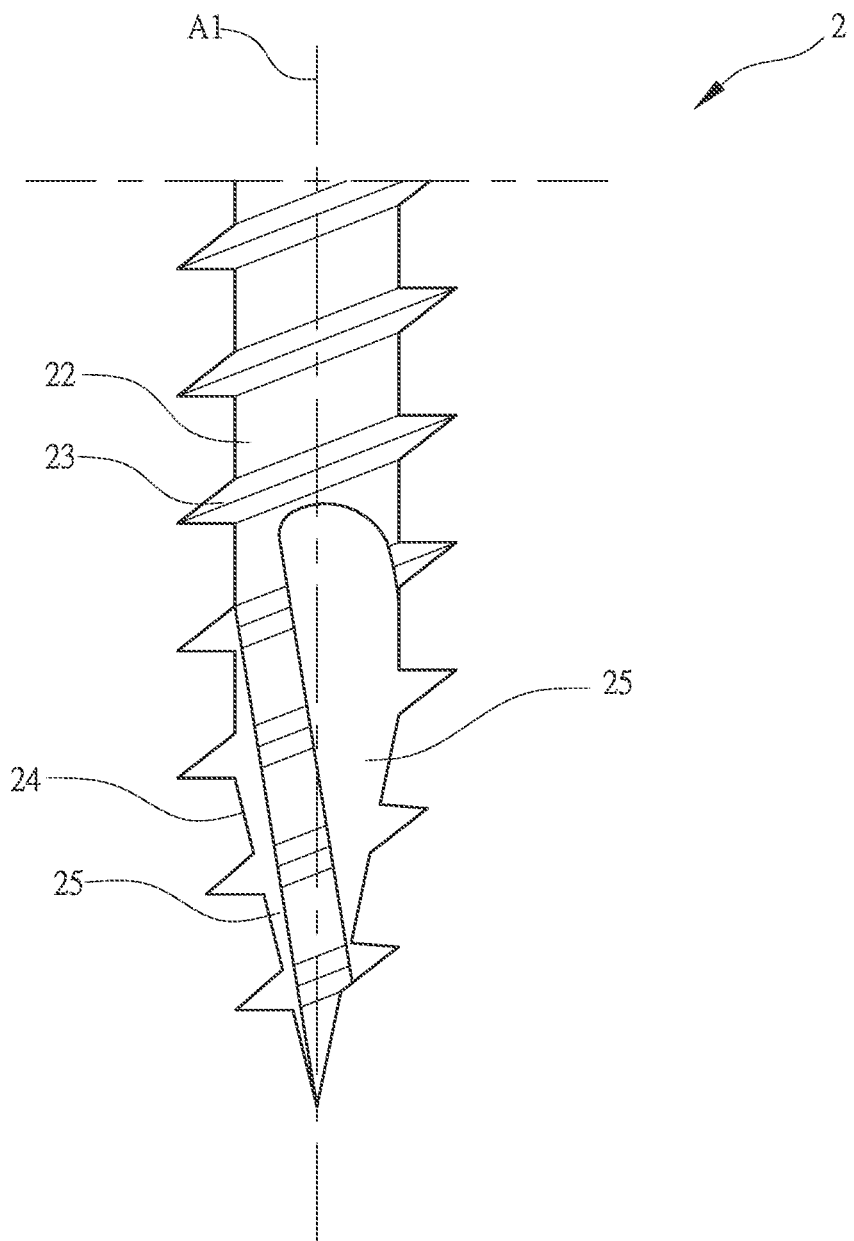
FIG. 4A is an embodiment having handedness opposite to that of FIG. 4
Figure 4B:
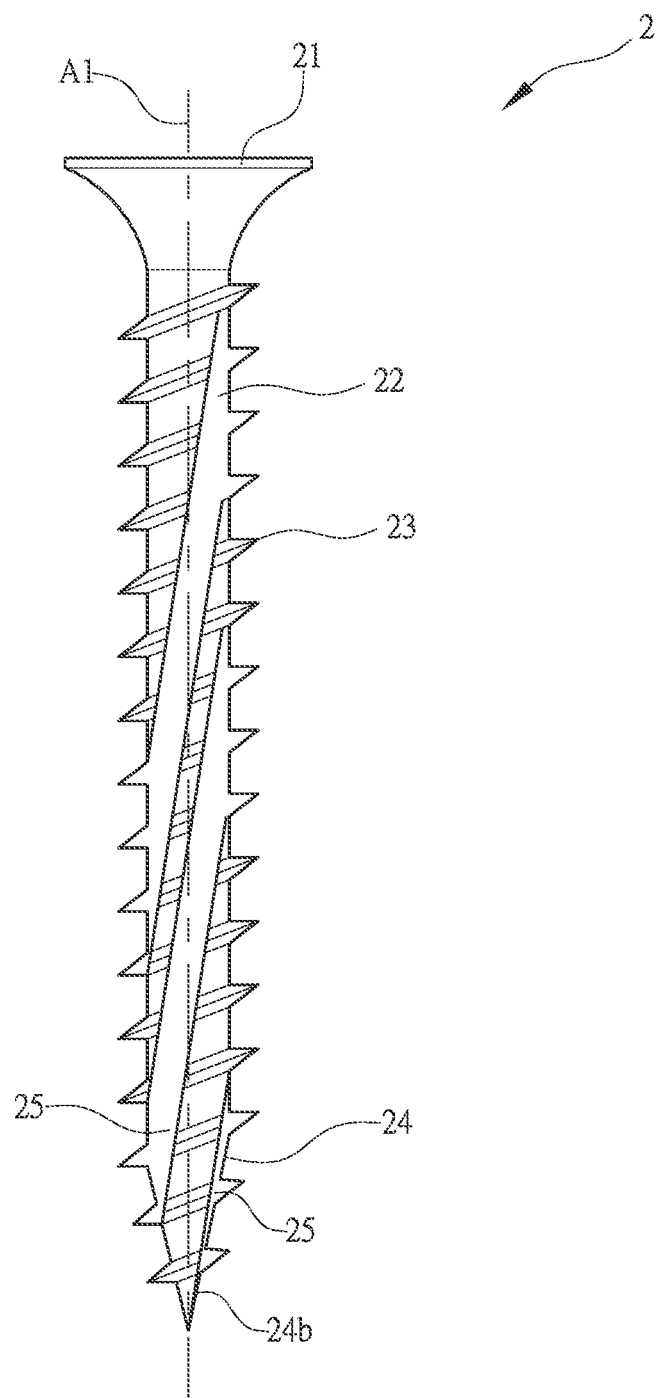
FIG. 4B is another embodiment of FIG. 4.

As shown in FIGS. 4, 4A, and 4B, the screw 2 comprises a screw head 21. A shank 22 extends downward from the screw head 21. The shank 22 has an outer circumferential surface that is formed, in a surrounding form, with a thread 23. The shank 22 has a lower end that is formed with a tapering tail section 24. The thread 23 is extended into the tapering tail section 24. The tapering tail section 24 is formed, through cutting and pressing, with the two or more chip removal grooves 25. The two or more chip removal grooves 25 can be formed on same one side or two sides of the tapering tail section 24 and the chip removal grooves 25 are arranged at an inclination angle in the leftward direction or rightward direction. In the drawing, an arrangement involving two chip removal grooves 25 is taken as an example for describing this invention, but the number of the chip removal grooves 25 of the present invention is not limited thereto, in which the chip removal grooves 25 may or may not comprise a portion of the thread 23. With the tapering tail section 24 being formed with at least two or more chip removal grooves 25, the chip removal grooves 25 on the right side do not exceed the screw center line A1 of the screw 2 and the chip removal grooves 25 on the left side are each 0.5 to 4.5 times in width of the rightmost chip removal groove 25 in order to improve the chip removal capability of the screw 2, each of the chip removal grooves having an inclination angle between 1°-89°, wherein in such an arrangement of parallel chip removal grooves, the inclination angle is set as inclination of 1°-15° in a rightward direction with respect to the screw center line A1 as a preferred example, and also to reduce screw-in torque of the screw 2 to thereby achieve an effect of saving labor and time in conducting an operation and also to prevent the occurrence of defects of wood cracking to enhance the quality of an operation conducted with the screw 2.

As shown in FIG. 4A, the tapering tail section 24 of the screw 2 is formed, through cutting or pressing, with two or more reverse chip removal grooves 25, and the chip removal grooves 25 may or may not comprise a portion of the thread 23, and each of the chip removal grooves 25 has an inclination angle between 91°-179° (inclining at 1°-89° in a leftward direction with respect to the screw center line A1), and each one of the chip removal grooves 25 on the right side is 0.5 to 4.5 times in width of the leftmost chip removal groove 25. In such an arrangement of parallel chip removal grooves, the inclination angle is set as inclination of 1°-15° in a leftward direction with respect to the screw center line A1 as a preferred example.

As shown in FIG. 4B, the cutting tip section 24b of the tapering tail section 24 is provided, on a single side or double sides thereof, with the chip removal grooves 25, and the chip removal grooves 25 are extended upward, as a straight line or helically, to any point on the thread 23. In the drawing, single chip removal groove 25 that is spiral and set in the same direction as the thread 23 is taken as an example for description of the present invention, but the number and direction of being forward or reverse of the chip removal grooves 25 of the present invention is not limited thereto.

Figure 5:
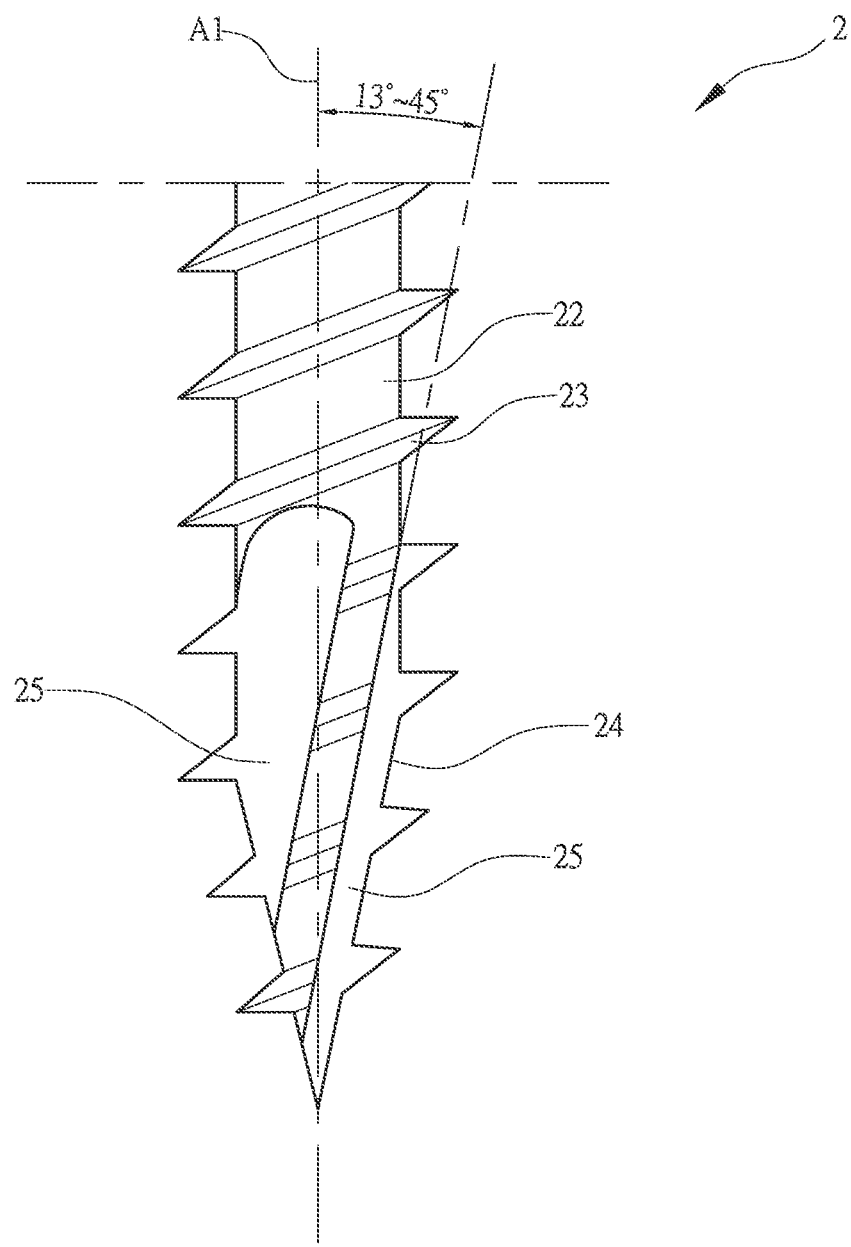
FIG. 5 is another embodiment of FIG. 4.
Figure 5A:
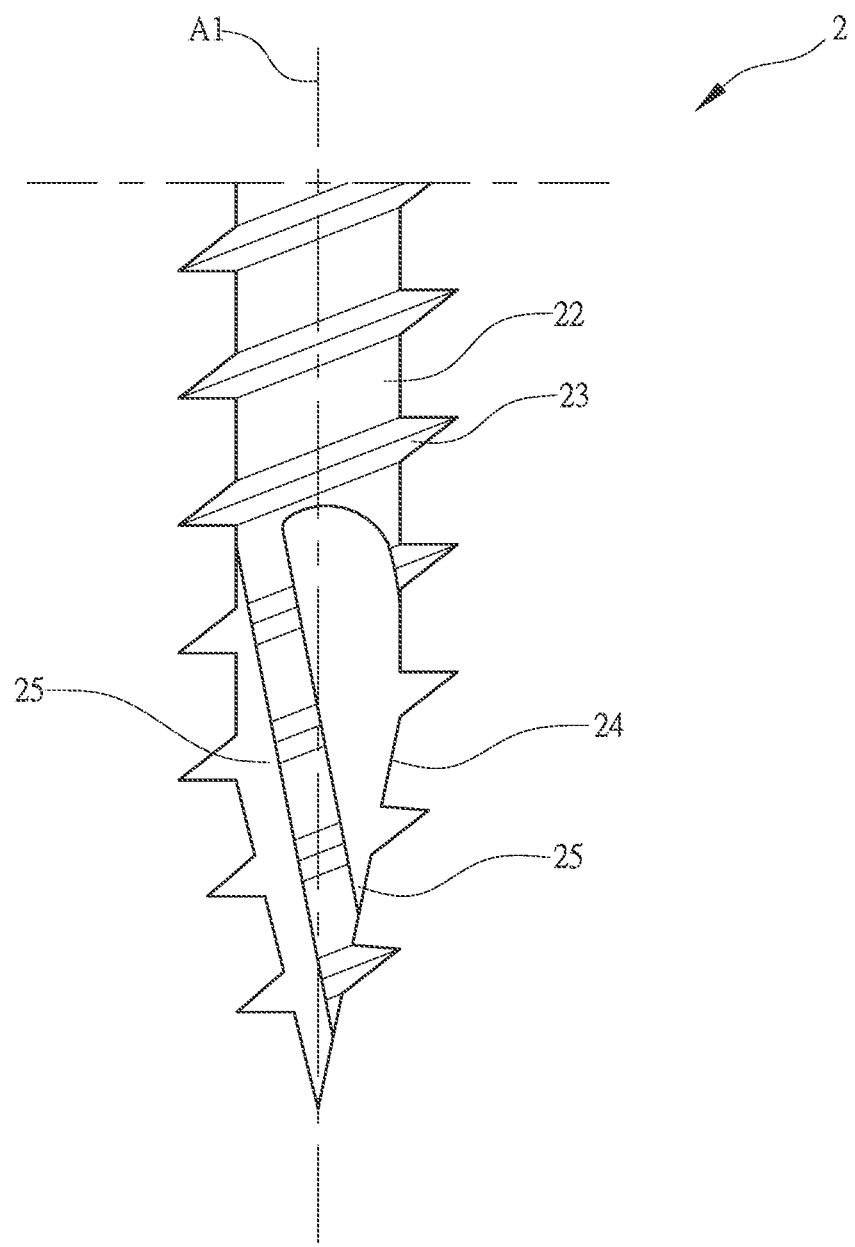
FIG. 5A is another embodiment of FIG. 5.

As shown in FIGS. 5 and 5A, the tapering tail section 24 of the screw 2 is provided with at least two or more chip removal grooves 25, and the chip removal grooves 25 are arranged at an inclination angle in the leftward direction or rightward direction. The two or more chip removal grooves 25 each exceed the screw center line A1, and the chip removal grooves 25 may or may not comprise a portion of the thread 23. In FIG. 5, the chip removal grooves 25 on the right side extend across and on two sides of the screw center line A1. In such an arrangement of the chip removal grooves 25, the inclination angle is set as inclination of 13°-45° in a rightward direction with respect to the screw center line A1, and the chip removal grooves 25 that extend across and on two sides the screw center line A1 have a width of a widest part thereof that is necessarily larger than or equal to an outside diameter of the thread 23 as a preferred example and each one of the chip removal grooves 25 on the left side is 0.5 to 4.5 times in width of the rightmost chip removal groove 25. In FIG. 5A, the chip removal grooves 25 on the left side extend across and on two sides of the screw center line A1. In such an arrangement of the chip removal grooves 25, the inclination angle is set as inclination of 13°-45° in a leftward direction with respect to the screw center line A1, and the chip removal grooves 25 that extend across and on two sides the screw center line A1 have a width of a widest part thereof that is necessarily larger than or equal to the outside diameter of the thread 23 as a preferred example and each one of the chip removal grooves 25 on the right side is 0.5 to 4.5 times in width of the leftmost chip removal groove 25.

Figure 5B:
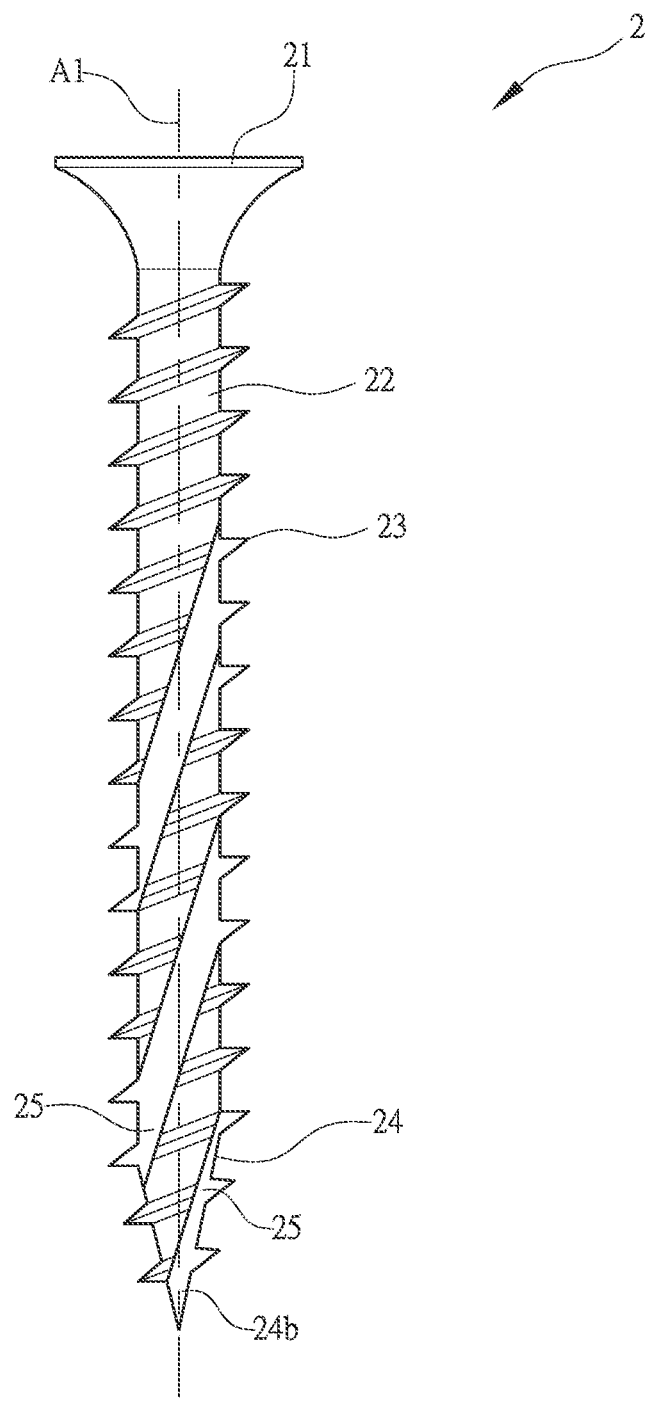
FIG. 5B is a further embodiment of FIG. 5.

As shown in FIG. 5B, a cutting tip section 24b of the tapering tail section 24 is provided, on a single side or double sides thereof, with the chip removal grooves 25, and the chip removal grooves 25 are extended upward, as a straight line or in a form similar to helix having an inclination angle, to any point on the thread 23. In the drawing, a single chip removal groove 25 that is spiral and set in the same direction as the thread 23 is taken as an example for description of the present invention, but the number and direction of being forward or reverse of the chip removal grooves 25 of the present invention is not limited thereto.

Figure 6:
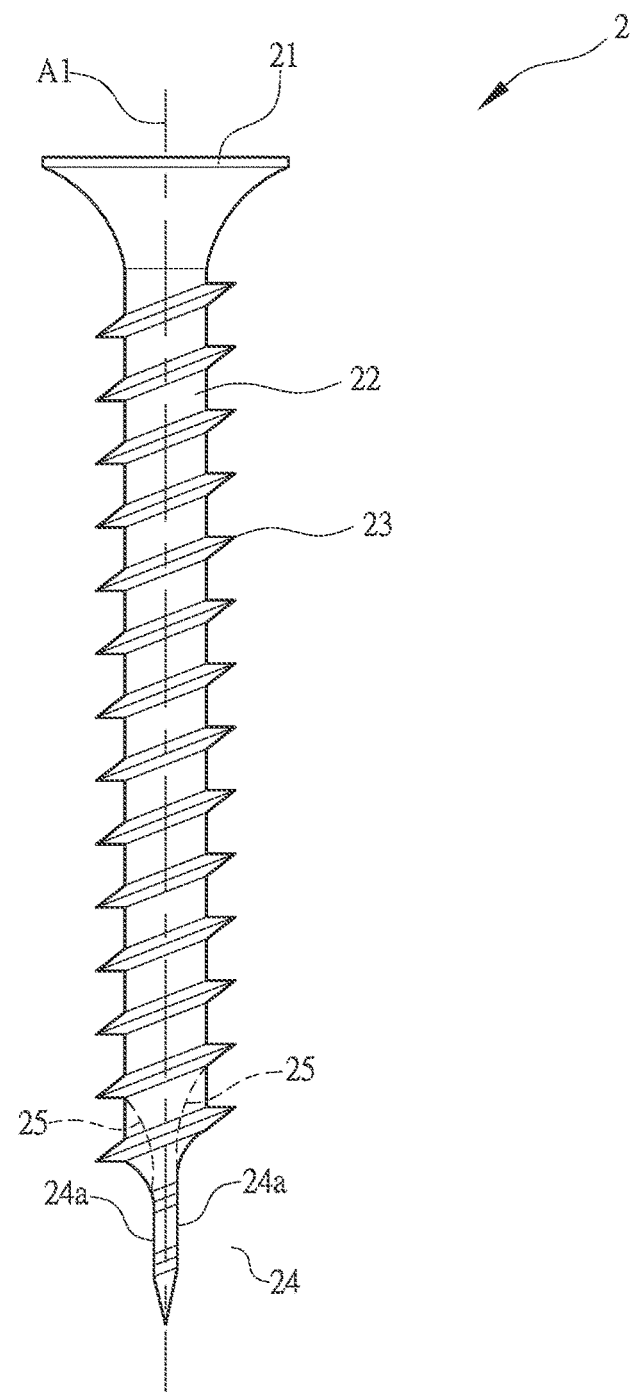
FIG. 6 is a screw having double-sided cutting tail section of the present invention.
Figure 7:
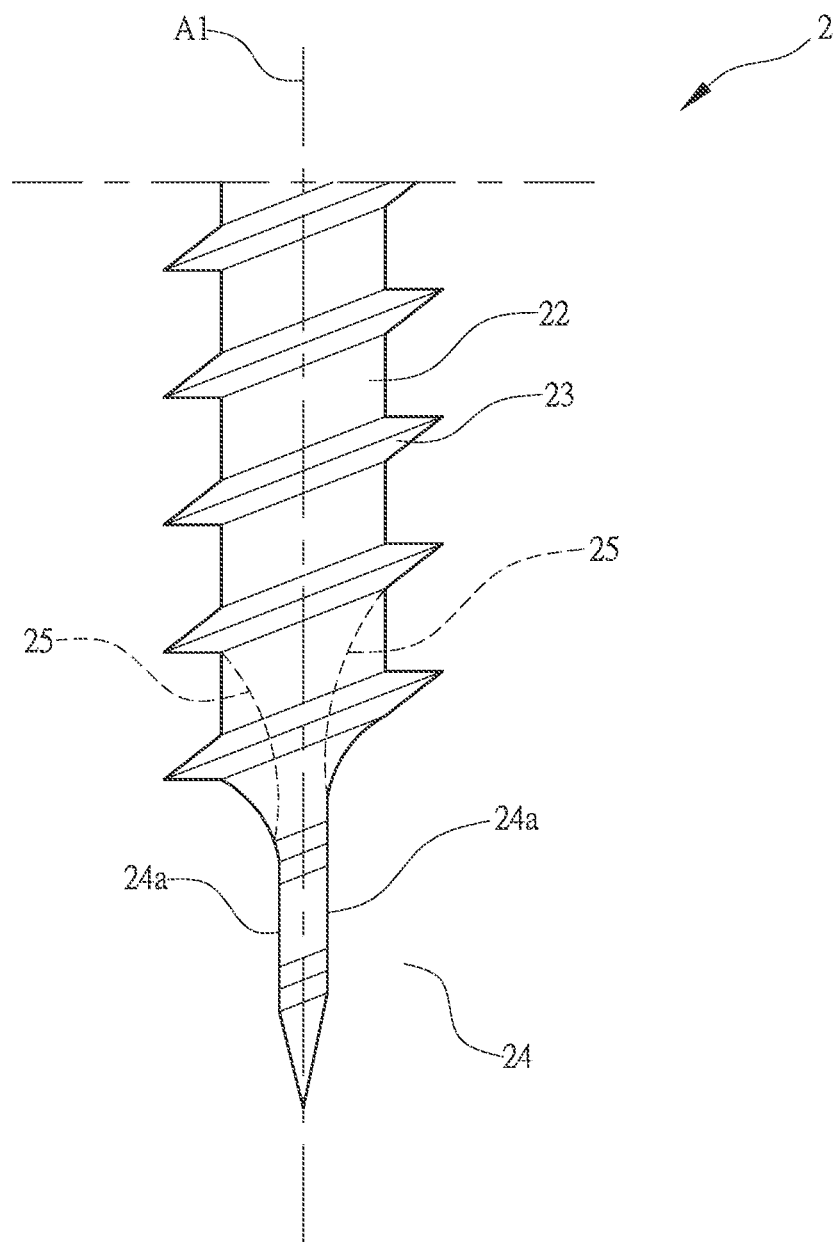
FIG. 7 is an enlarged view of a portion of FIG. 6.

As shown in FIGS. 6 and 7, the screw 2 comprises a screw head 21. A shank 22 extends downward from the screw head 21. The shank 22 has an outer circumferential surface that is formed, in a surrounding form, with a thread 23. The shank 22 has a lower end that is formed with a tapering tail section 24, wherein the tapering tail section 24 may or may not be provided with the thread 23. Two sides of the tapering tail section 24 are cut or pressed toward a center thereof to form a plate-like double-sided cutting tip section 24a, wherein the plate-like cutting section may or may not comprise a portion of the thread 23, and a distance from an outer end of the cutting tip section 24a to the screw center line A1 is around 0.1 mm to 12 mm, and in an portion of the double-sided cutting tip section 24a connected with the thread 23, one or more chip removal grooves 25 are formed with cutting or pressing and the one or more chip removal grooves 25 may be formed on one, same side or two sides of the screw shank 22 above the double-sided cutting tip section 24a, namely being arranged in a symmetric or non-symmetric form. The one or more chip removal grooves 25 do not exceed or may all exceed or may have just one thereof exceeding the screw center line A1 of the screw 2 to improve the chip removal capability of the screw 2 and also reduce screw-in torque of the screw 2 to thereby achieve an effect of saving labor and time in conducting an operation and also to prevent the occurrence of defects of wood cracking to enhance the quality of an operation conducted with the screw 2.

Figure 7A:
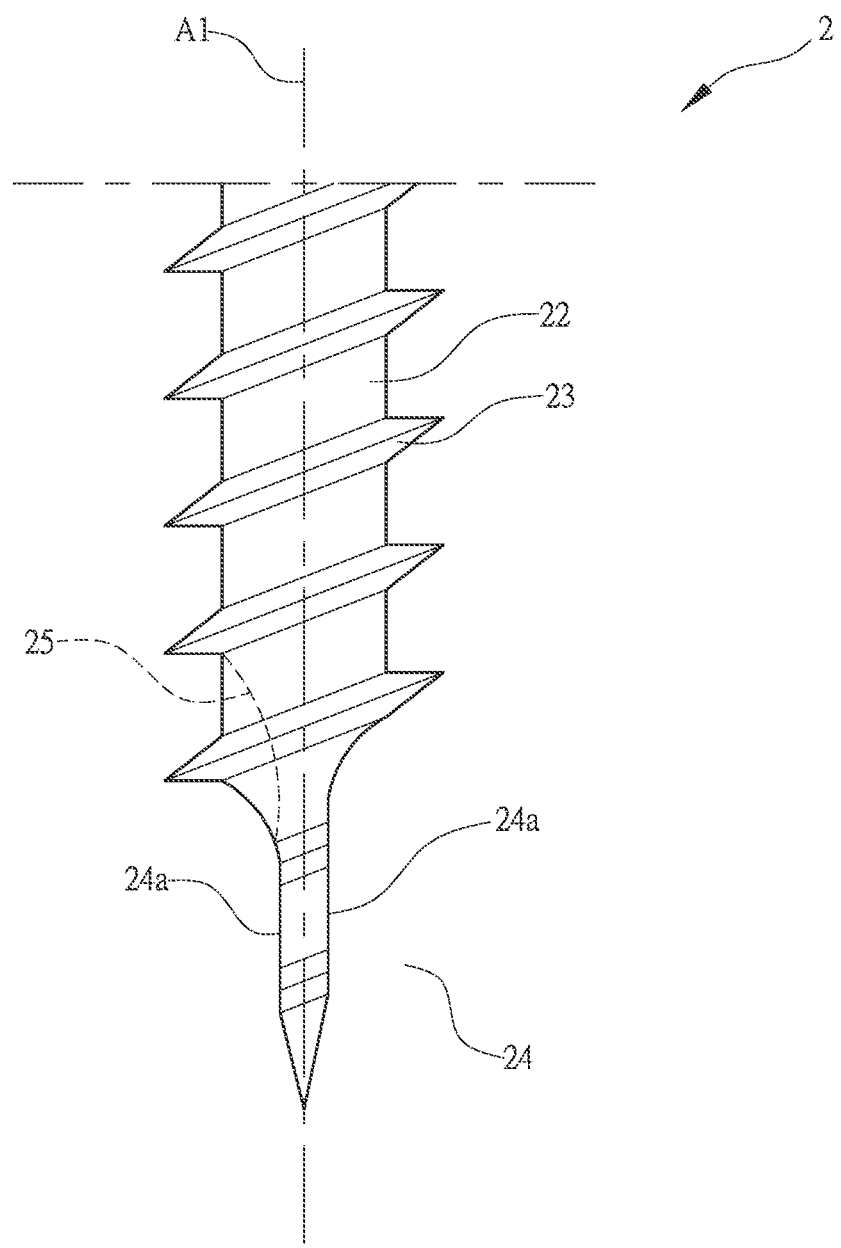
FIG. 7A is another embodiment of FIG. 7.

As shown in FIG. 7A, the cutting tip section 24a of the tapering tail section 24 can be formed with the chip removal grooves 25 on just one side thereof.

Figure 7B:
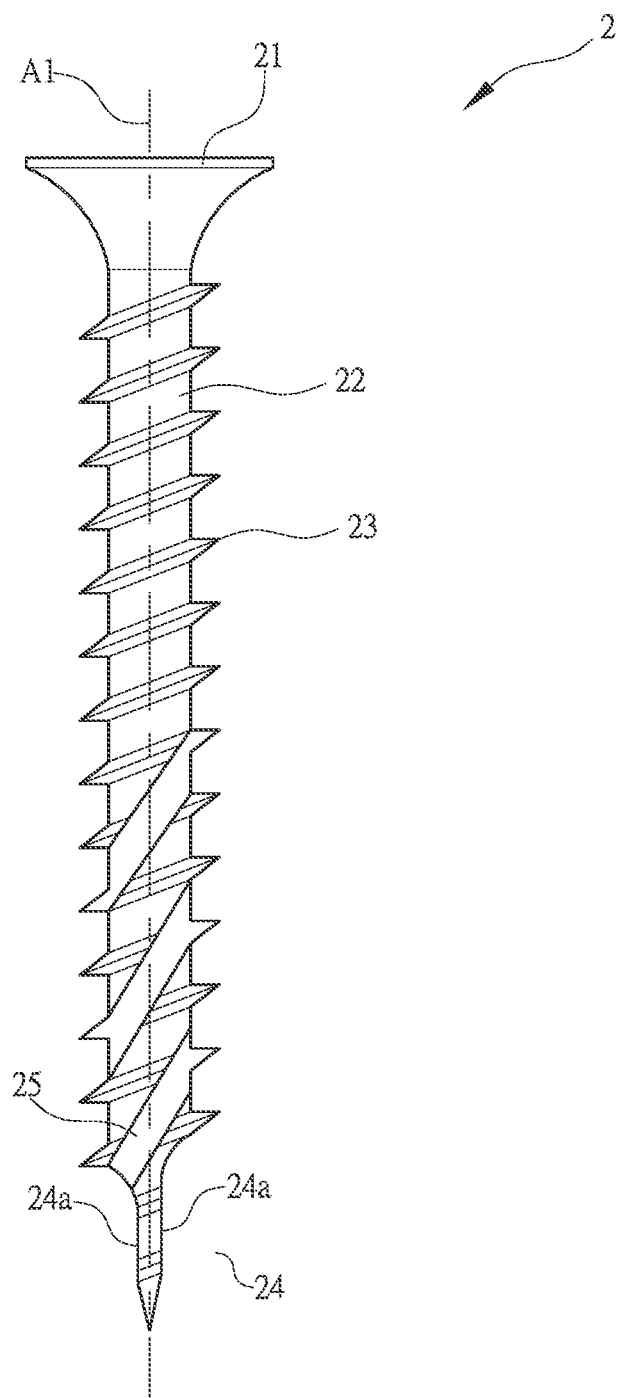
FIG. 7B is a further embodiment of FIG. 7.

As shown in FIG. 7B, the cutting tip section 24a of the tapering tail section 24 can be provided, on a single side or double sides thereof, with the chip removal grooves 25, and the chip removal grooves 25 are extended upward, as a straight line or in a form similar to helix having an inclination angle in a forward direction or a reverse direction, to any point on the thread 23. In the drawing, a single chip removal groove 25 that is spiral and set in the same direction as the thread 23 is taken as an example for description of the present invention, but the number of the chip removal grooves 25 of the present invention is not limited thereto.

Figure 8:
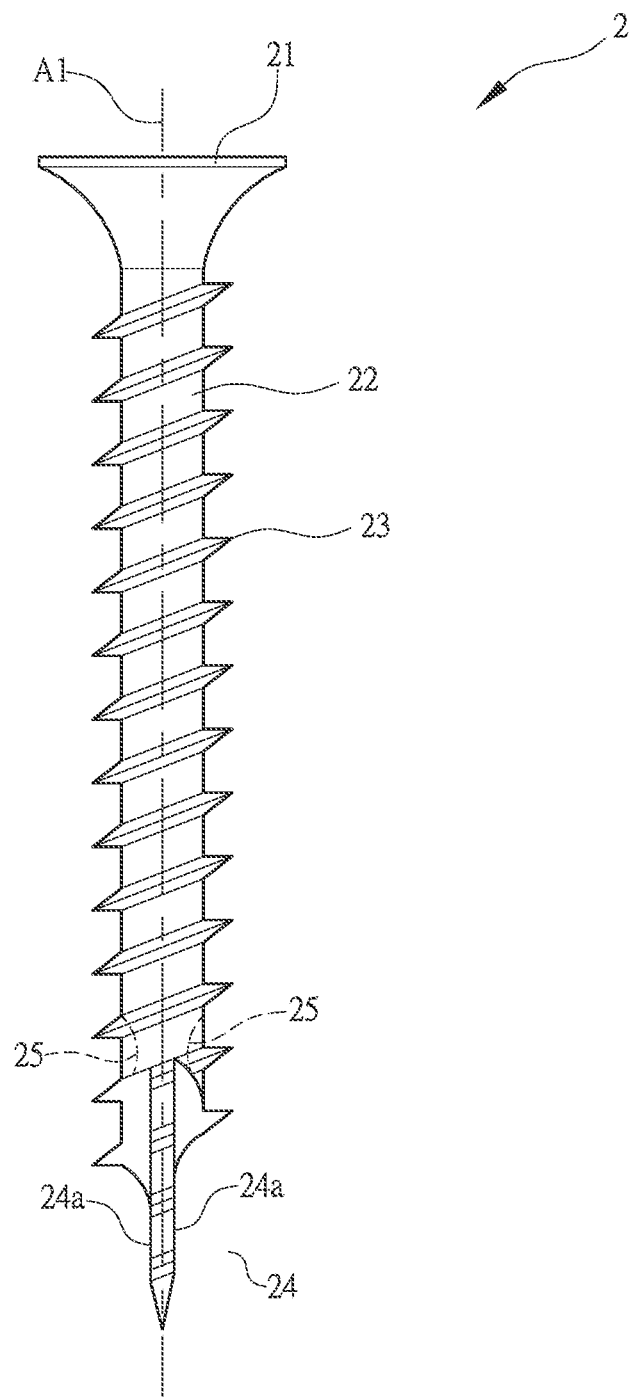
FIG. 8 is another embodiment of FIG. 6.
Figure 9:
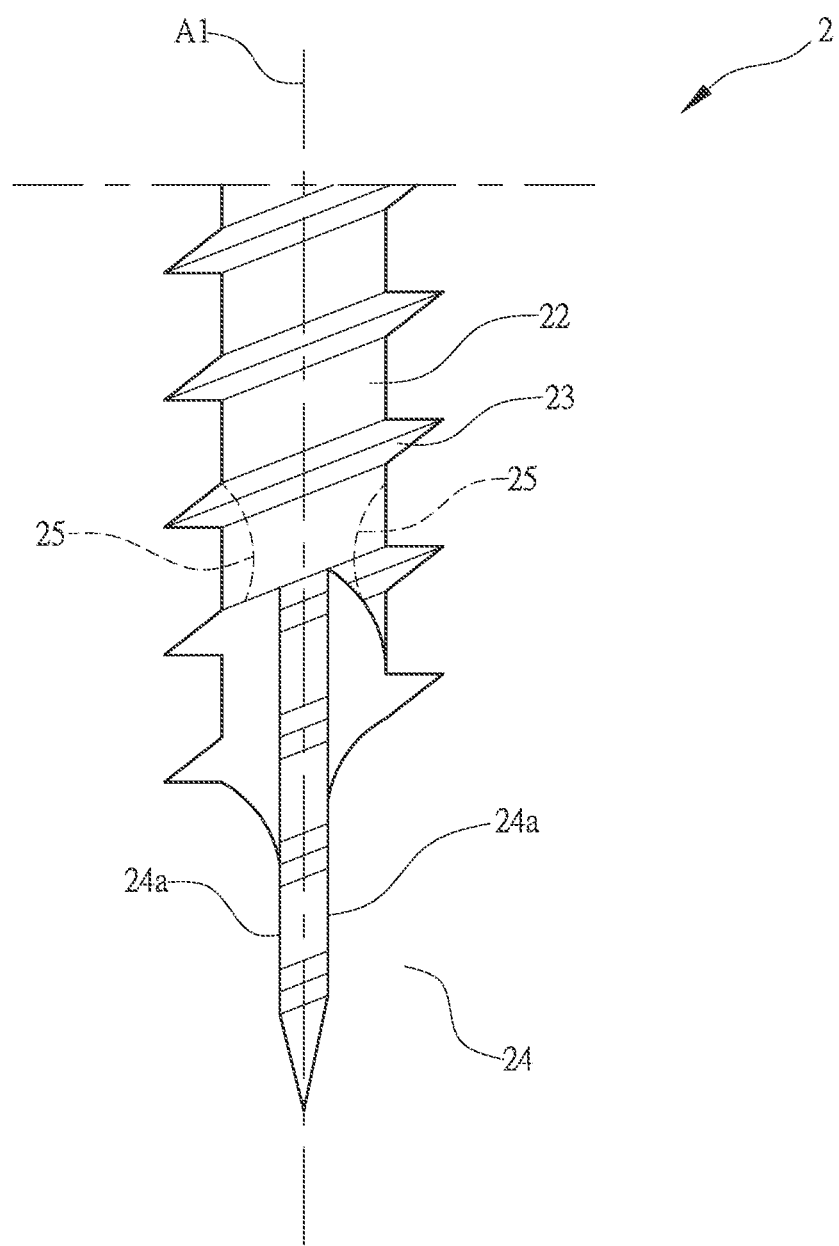
FIG. 9 is an enlarged view of a portion of FIG. 8.

As shown in FIGS. 8 and 9, following the above description, the cutting tip section 24a and the plate-like double-sided cutting tip section 24a may or may not comprise a portion of the thread 23, and the screw shank 22 that is located above and spaced by one thread 23 is formed, through cutting or pressing, with one or more the chip removal grooves 25, and the one or more chip removal grooves 25 may be formed one, same side or two sides of the screw shank 22 located above the double-sided cutting tip section 24a and the more than one chip removal grooves 25 do not exceed or may all exceed or may have any one thereof exceeding the screw center line A1 of the screw 2 to improve the chip removal capability of the screw 2 and also reduce screw-in torque of the screw 2 to thereby achieve an effect of saving labor and time in conducting an operation and also to prevent the occurrence of defects of wood cracking to enhance the quality of an operation conducted with the screw 2.

Figure 9A:
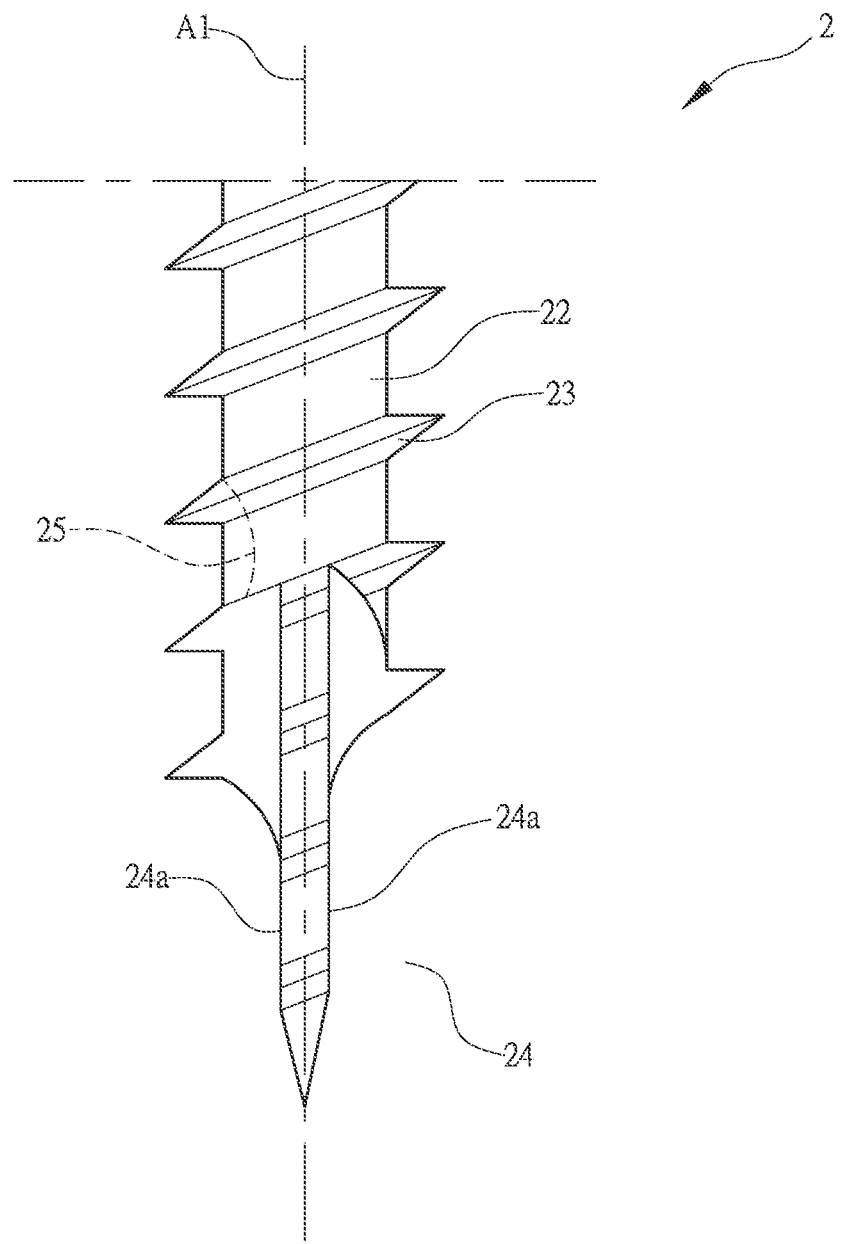
FIG. 9A is another embodiment of FIG. 9.

As shown in FIG. 9A, the cutting tip section 24a of the tapering tail section 24 can be formed with the chip removal grooves 25 on a single side or two sides thereof. In FIG. 9A, forming the chip removal grooves 25 on a single side is taken as an example for illustration, but the number of the chip removal grooves 25 of the present invention is not limited thereto.

Figure 9B:
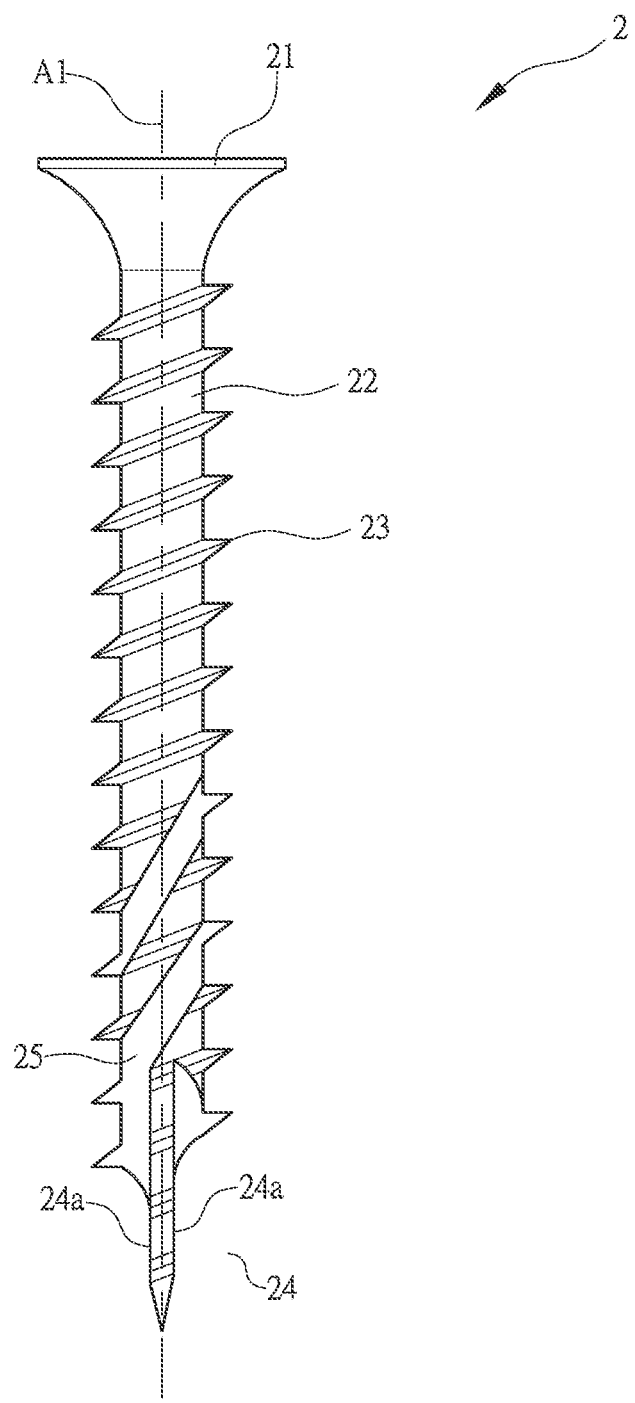
FIG. 9B is a further embodiment of FIG. 9.
Figure 10:
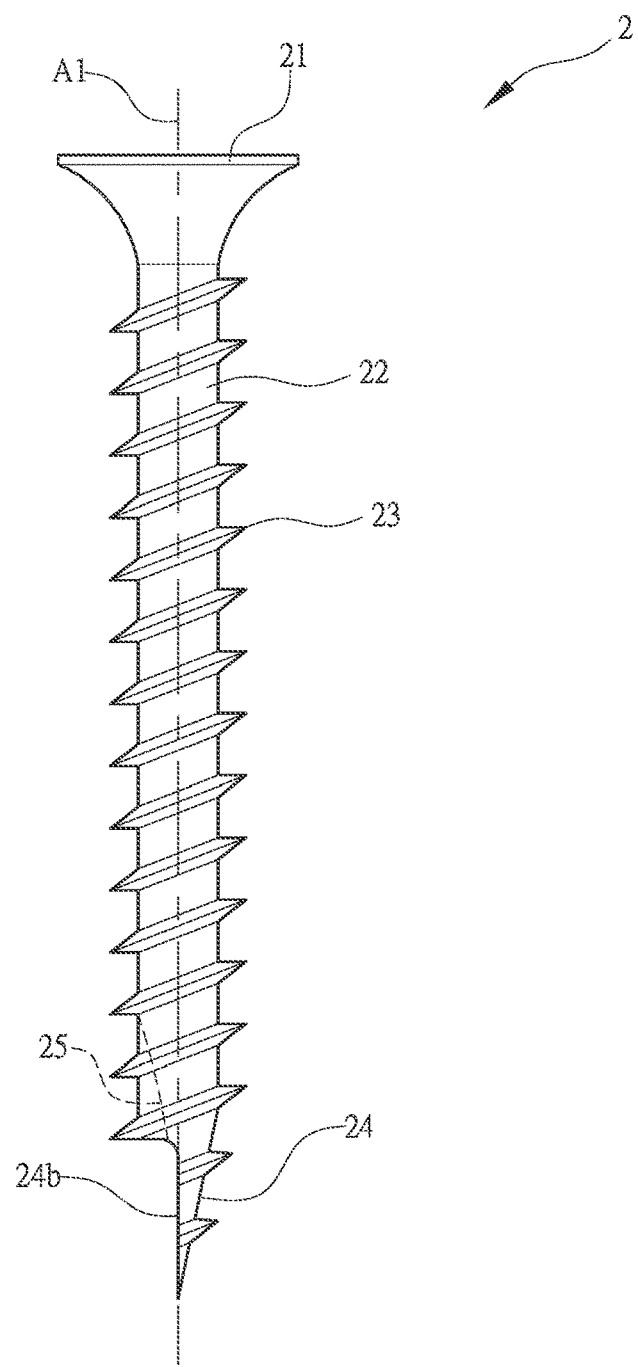
FIG. 10 is a screw having single-sided cutting tail section of the present invention.

As shown in FIG. 9B, the cutting tip section 24a of the tapering tail section 24 can be provided, on a single side or double sides thereof, with the chip removal grooves 25, and the chip removal grooves 25 are extended upward, as a straight line or in a form similar to helix having an inclination angle in a forward direction or a reverse direction, to any point on the thread 23. In the drawing, a single chip removal groove 25 that is spiral and set in the same direction as the thread 23 is taken as an example for description of the present invention, but the number of the chip removal grooves 25 of the present invention is not limited thereto.

As shown in FIGS. 10, 11, 11A, 12, and 12A, the screw 2 comprises a screw head 21. A shank 22 extends downward from the screw head 21. The shank 22 has an outer circumferential surface that is formed, in a surrounding form, with a thread 23. The shank 22 has a lower end that is formed with a tapering tail section 24, wherein the thread 23 is extended to the tapering tail section 24, and one side of the tapering tail section 24 is cut or pressed toward a center thereof, or close to the center, to form a plate-like single-sided cutting tip section 24b. In an upper portion of the single-sided cutting tip section 24b connected with the thread 23, one or more chip removal grooves 25 are formed with cutting or pressing and the one or more chip removal grooves 25 may be formed on one, same side or two sides of the screw shank 22 above the single-sided cutting tip section 24b. The more than one chip removal grooves 25 all do not exceed the screw center line A1 or may have just one thereof exceeding the screw center line A1 of the screw 2 to improve the chip removal capability of the screw 2 and also reduce screw-in torque of the screw 2 to thereby achieve an effect of saving labor and time in conducting an operation and also to prevent the occurrence of defects of wood cracking to enhance the quality of an operation conducted with the screw 2.

Figure 11:
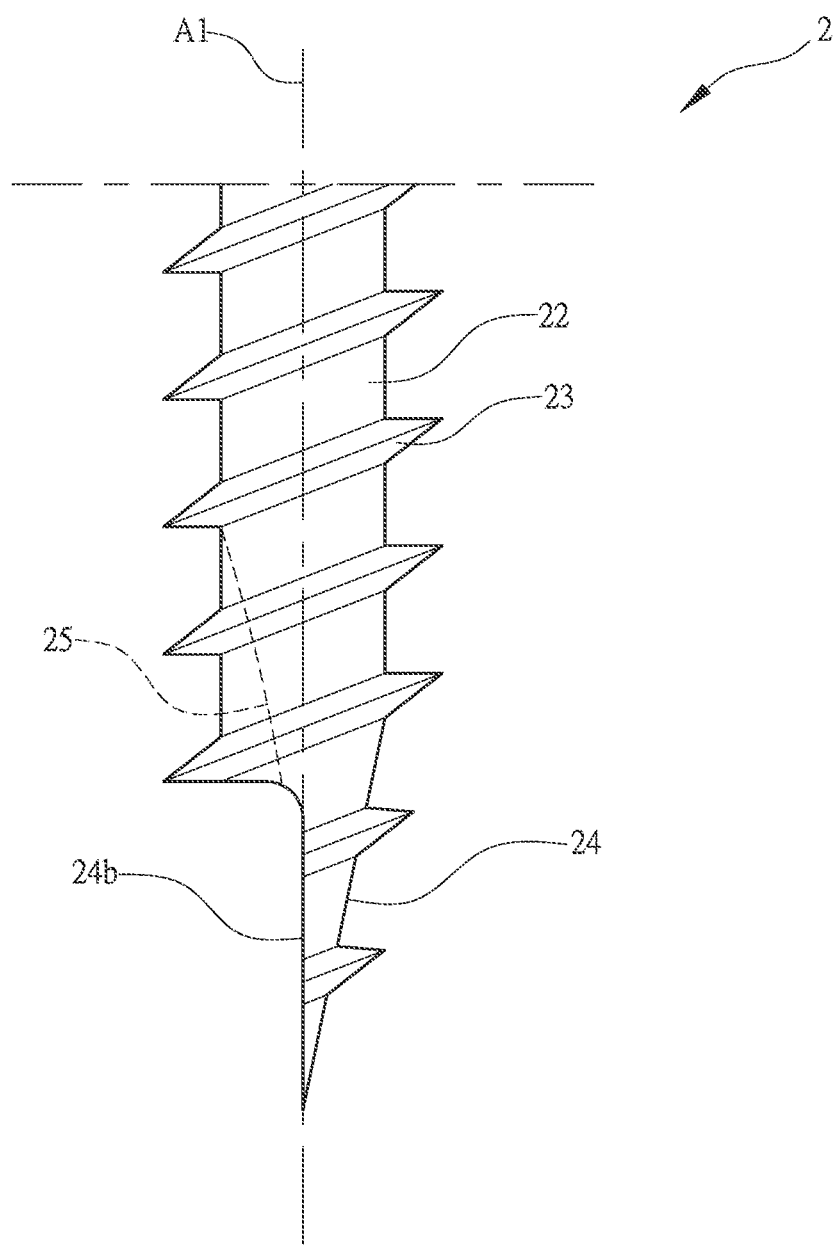
FIG. 11 is an enlarged view of a portion of FIG. 10.
Figure 11A:
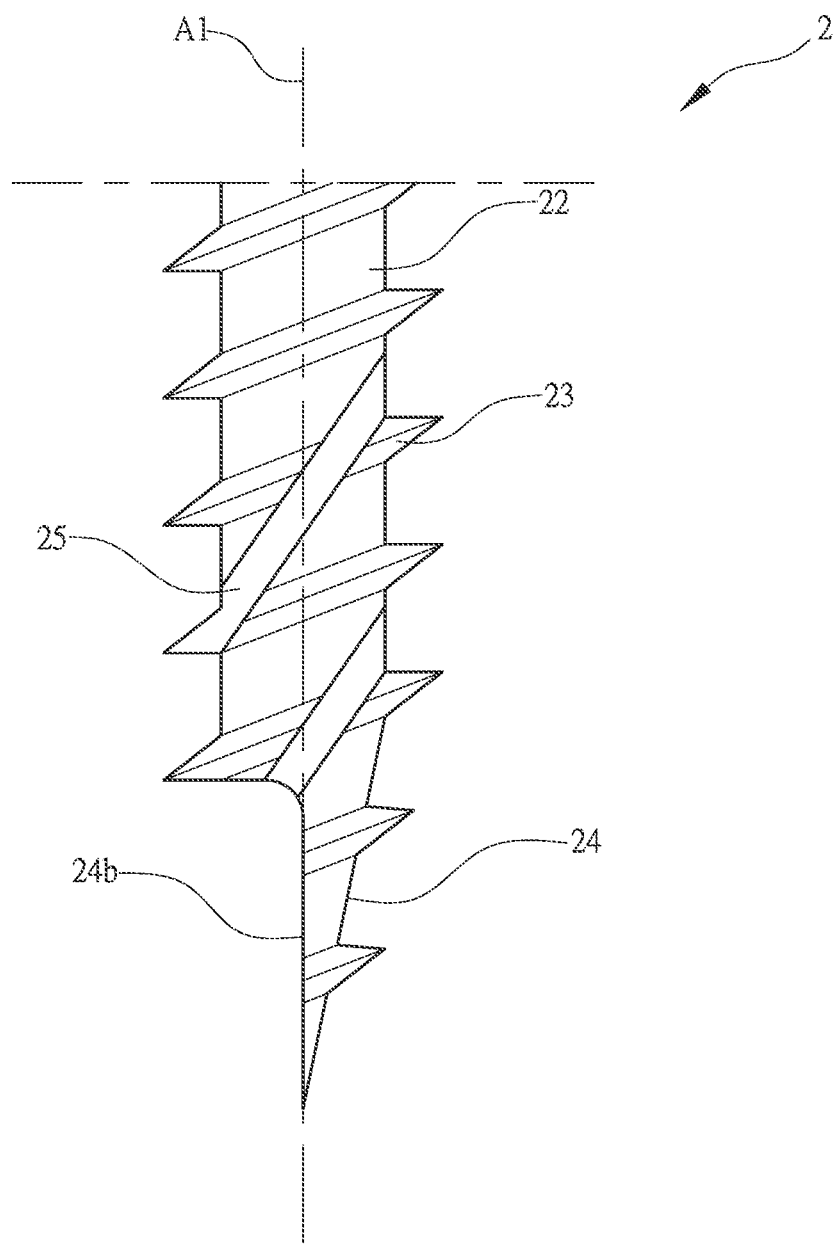
FIG. 11A is another embodiment of FIG. 10.

As shown in FIGS. 11 and 11A, the cutting tip section 24b of the tapering tail section 24 can be provided with the chip removal grooves 25 on a single side or double sides thereof or in a manner of extending as a straight line or helically, and the chip removal grooves 25 are extended upward, as a straight line or helically, without limitation to length thereof, to any point on the thread 23. In FIG. 11, the chip removal grooves 25 being arranged on a single side is taken as an example for illustration, but the number of the chip removal grooves 25 of the present invention is not limited thereto. In FIG. 11, a single chip removal groove 25 that is spiral is taken as an example for description of the present invention, but the number and form of the chip removal grooves 25 of the present invention are not limited thereto.

Figure 12:
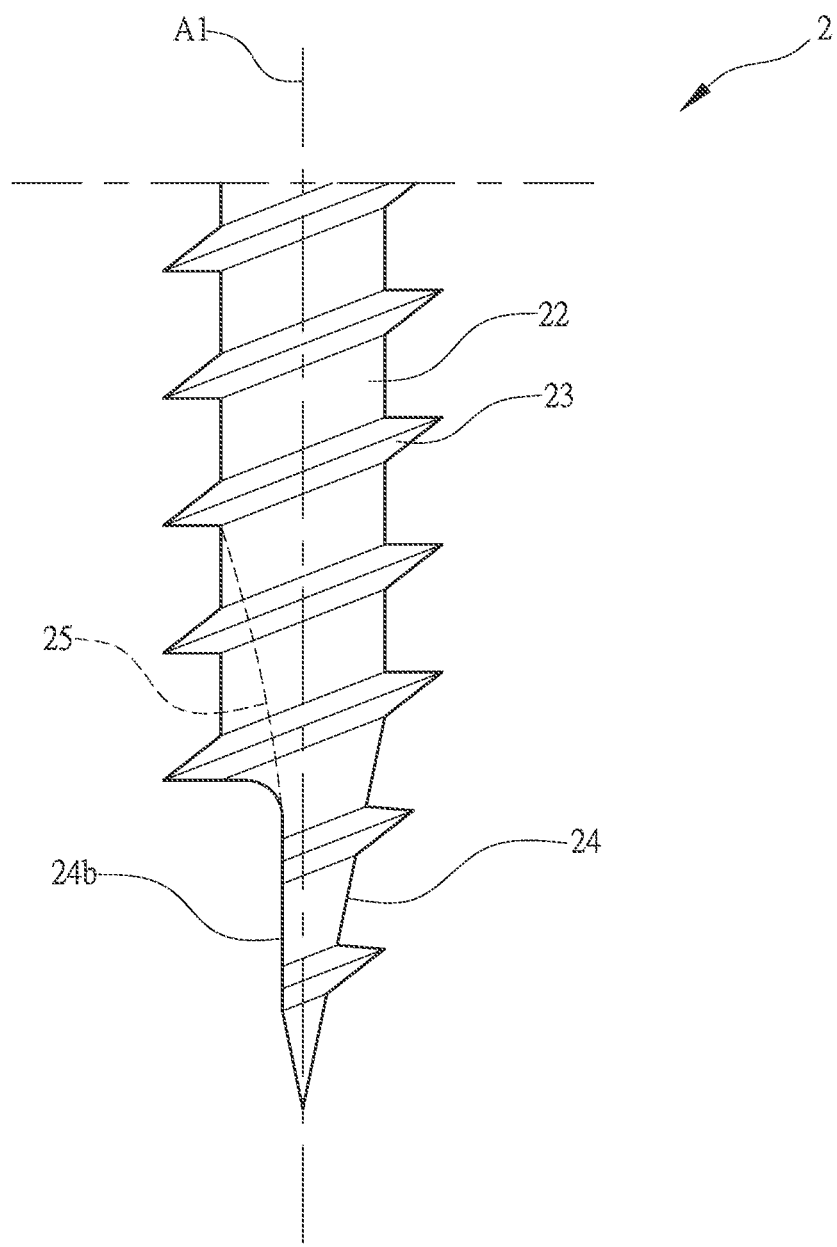
FIG. 12 is a further embodiment of FIG. 10.
Figure 12A:
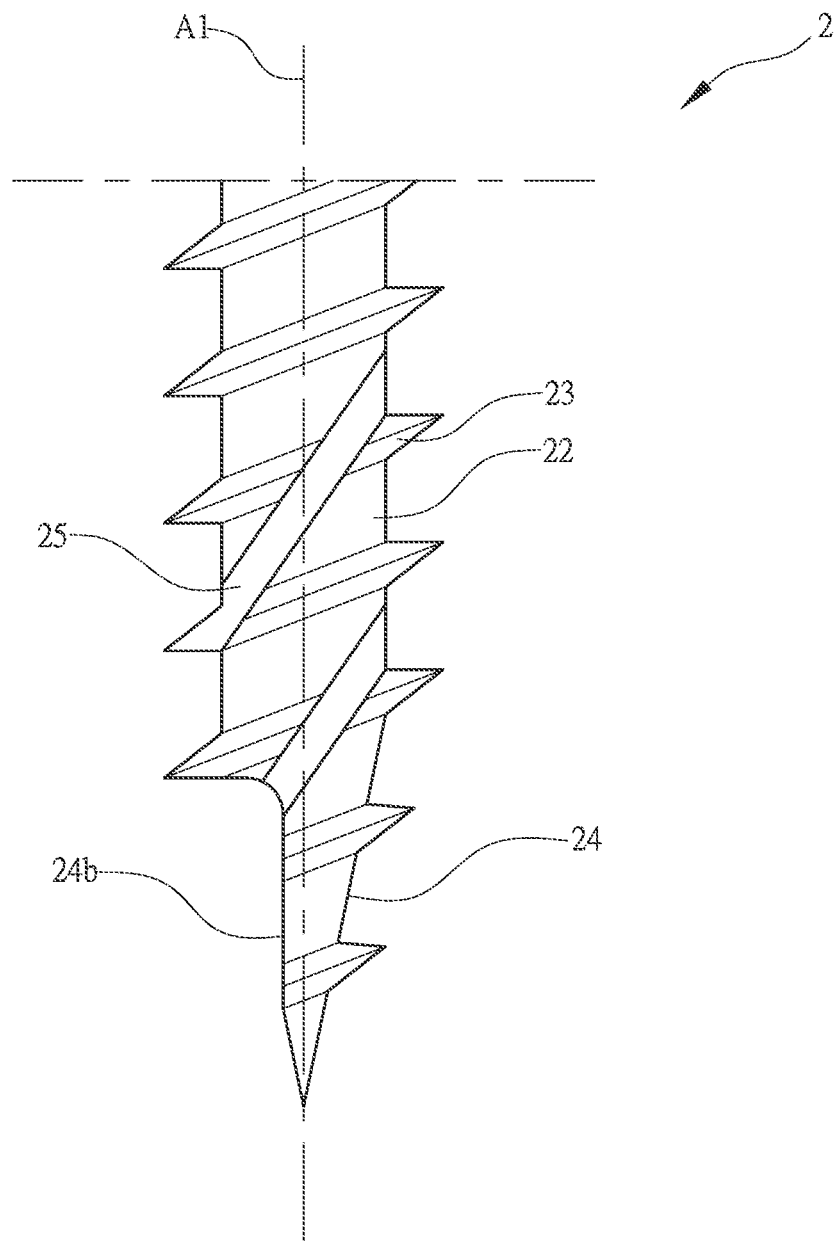
FIG. 12A is a further embodiment of FIG. 12.

As shown in FIGS. 12 and 12A, the cutting tip section 24b of the tapering tail section 24 can be provided with the chip removal grooves 25 on a single side or double sides thereof or in a manner of extending as a straight line or helically. In FIG. 12, the chip removal grooves 25 being arranged on a single side is taken as an example for illustration, but the number of the chip removal grooves 25 of the present invention is not limited thereto. In FIG. 12A, the chip removal grooves 25 are extended upward, as a straight line or helically, without limitation to length thereof, to any point on the thread 23. In the drawings, a single chip removal groove 25 that is spiral is taken as an example for description of the present invention, but the number of the chip removal grooves 25 of the present invention is not limited thereto.

As shown in FIGS. 13, 13A, 14, and 14A, the screw 2 comprises a screw head 21. A shank 22 extends downward from the screw head 21. The shank 22 has an outer circumferential surface that is formed, in a surrounding form, with a thread 23. The shank 22 has a lower end that is formed with a tapering tail section 24, wherein the thread 23 is extended to the tapering tail section 24, and one side of the tapering tail section 24 is cut or pressed toward a center thereof, or close to the center, to form a plate-like single-sided cutting tip section 24b, wherein the single-sided cutting tip section 24b may or may not comprise a portion of the thread 23. In an upper portion of the single-sided cutting tip section 24b connected with the thread 23, one or more chip removal grooves 25 are formed with cutting or pressing and the one or more chip removal grooves 25 may be formed on one, same side or two sides of the screw shank 22 above the single-sided cutting tip section 24b. The more than one chip removal grooves 25 all do not exceed or all exceed or may have just one thereof exceeding the screw center line A1 of the screw 2 to improve the chip removal capability of the screw 2 and also reduce screw-in torque of the screw 2 to thereby achieve an effect of saving labor and time in conducting an operation and also to prevent the occurrence of defects of wood cracking to enhance the quality of an operation conducted with the screw 2.

Figure 13:
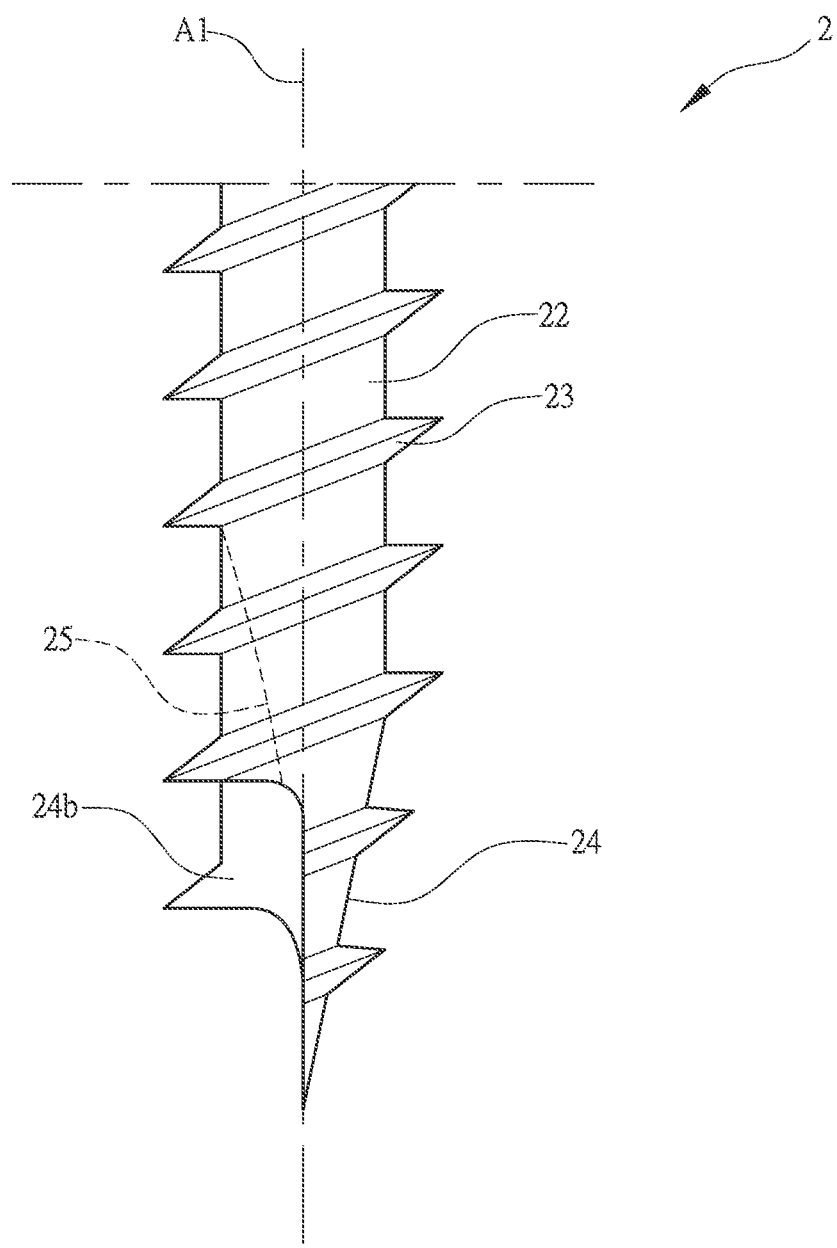
FIG. 13 is another embodiment of another FIG. 10.
Figure 13A:
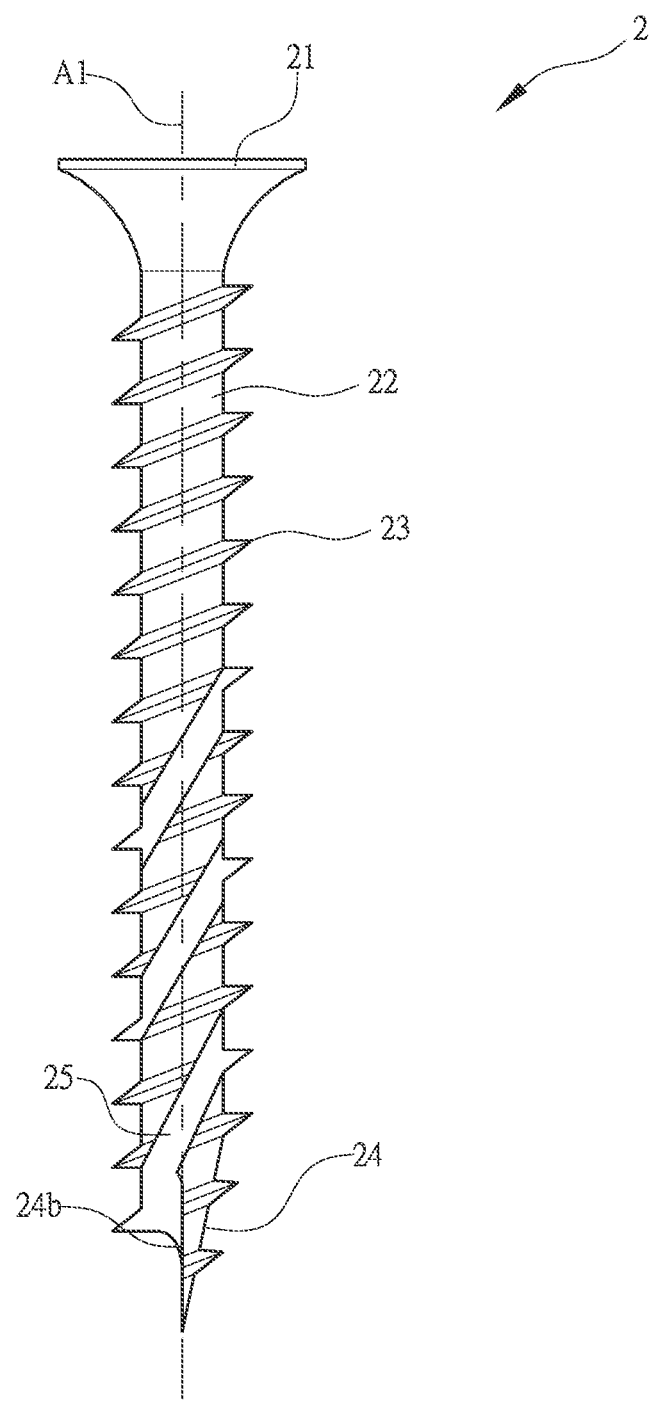
FIG. 13A is another embodiment of FIG. 13.

As shown in FIG. 13A, the cutting tip section 24b of the tapering tail section 24 is provided, on a single side or double sides thereof, with the chip removal grooves 25, and the chip removal grooves 25 are extended upward, as a straight line or helically in forward direction or reverse direction, to any point on the thread 23. In the drawing, single chip removal groove 25 that is spiral and set in the same direction as the thread 23 is taken as an example for description of the present invention, but the number and direction of being forward or reverse of the chip removal grooves 25 of the present invention is not limited thereto.

Figure 14:
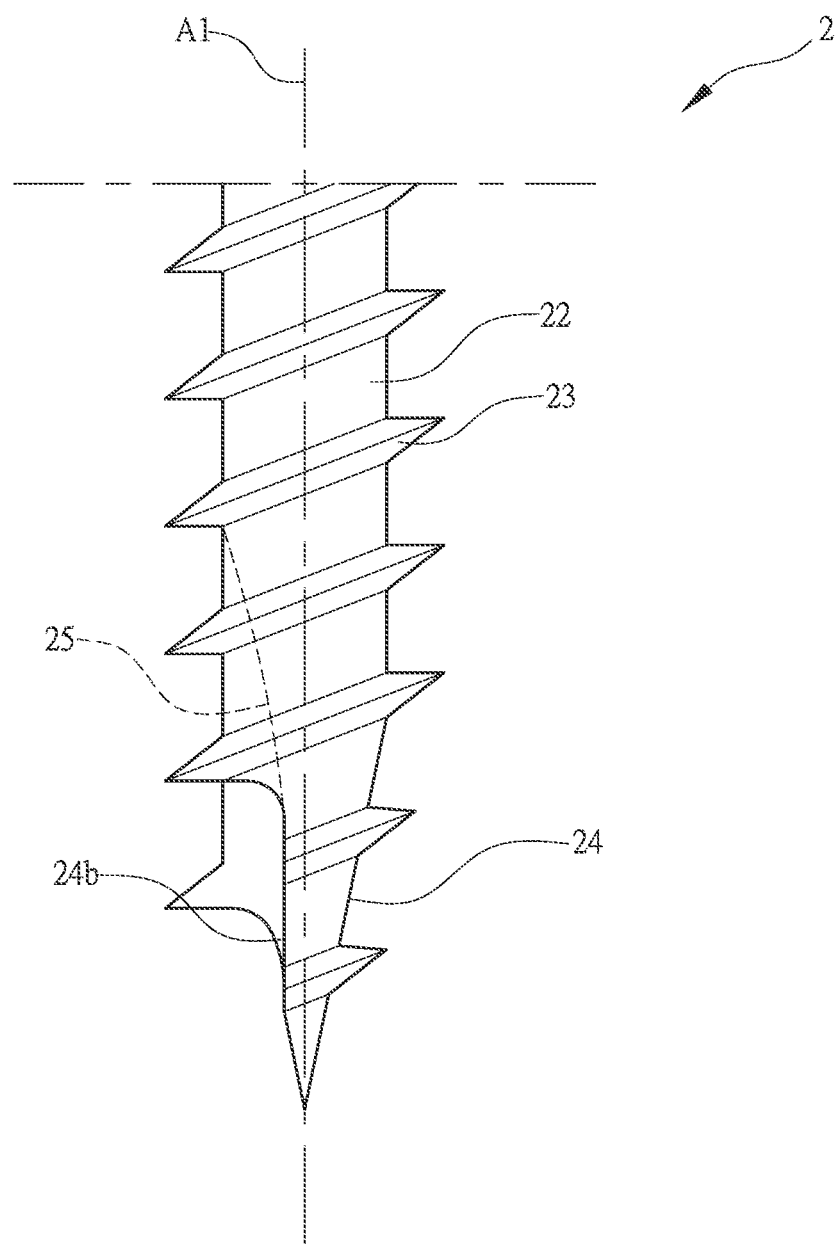
FIG. 14 is another embodiment of FIG. 10.
Figure 14A:
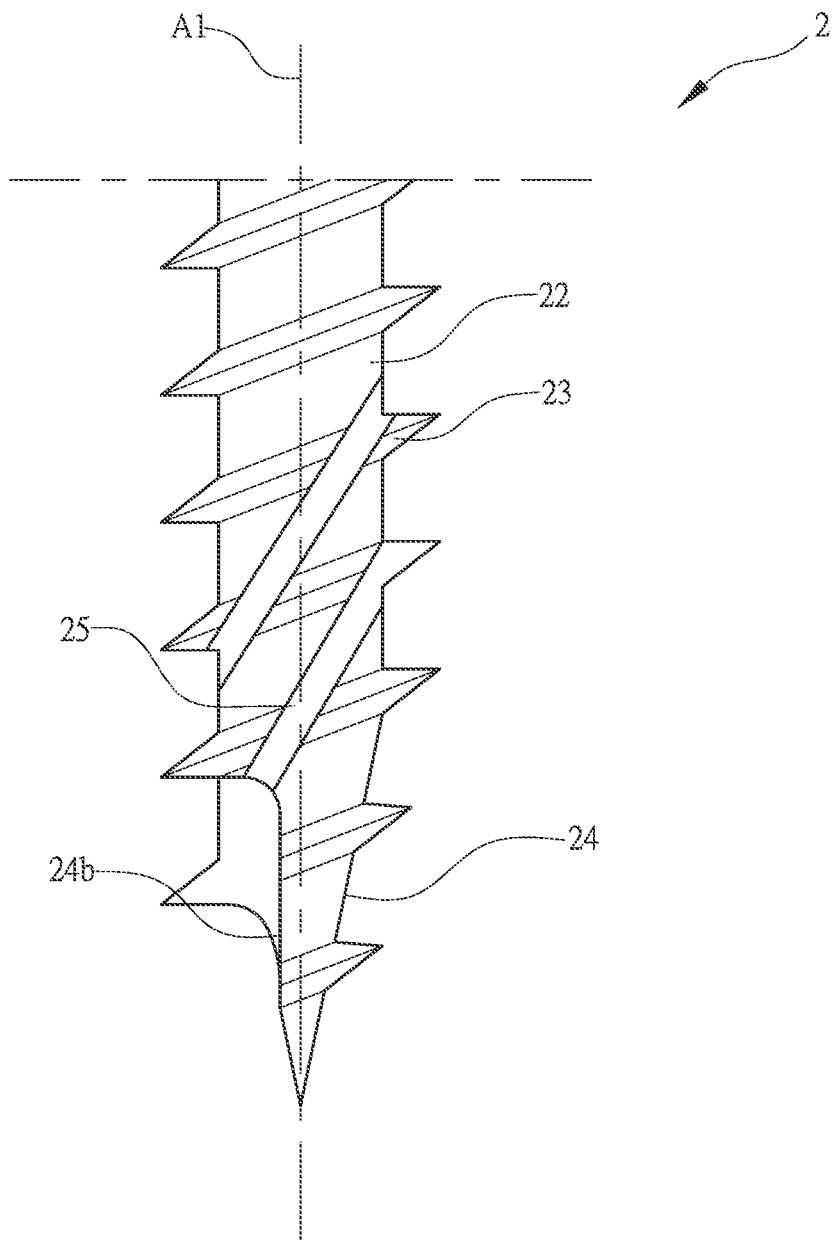
FIG. 14A is another embodiment of FIG. 14.

As shown in FIG. 14A, the cutting tip section 24b of the tapering tail section 24 is provided, on a single side or double sides thereof, with the chip removal grooves 25, and the chip removal grooves 25 are extended upward, as a straight line or helically, to any point on the thread 23. In the drawing, single chip removal groove 25 that is spiral and set in the same direction as the thread 23 is taken as an example for description of the present invention, but the number and direction of being forward or reverse of the chip removal grooves 25 of the present invention is not limited thereto.

Figure 15:
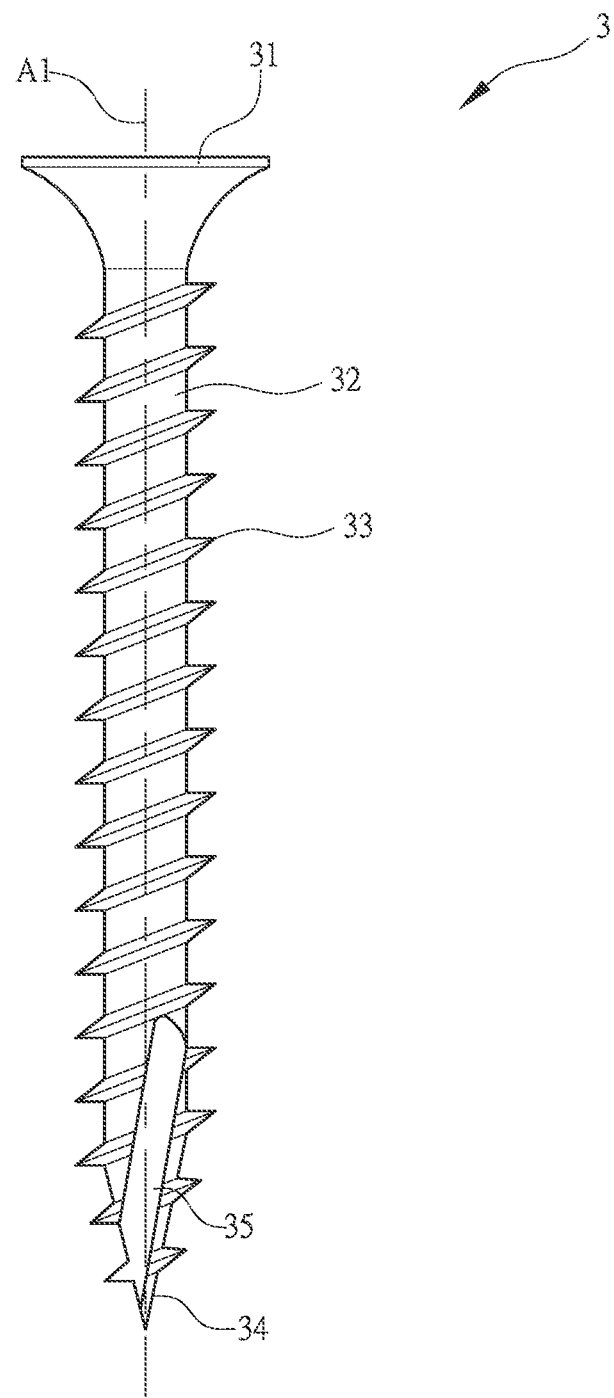
FIGS. 15,15A, and 15B are a further embodiment of a screw according to the present invention.
Figure 15A:
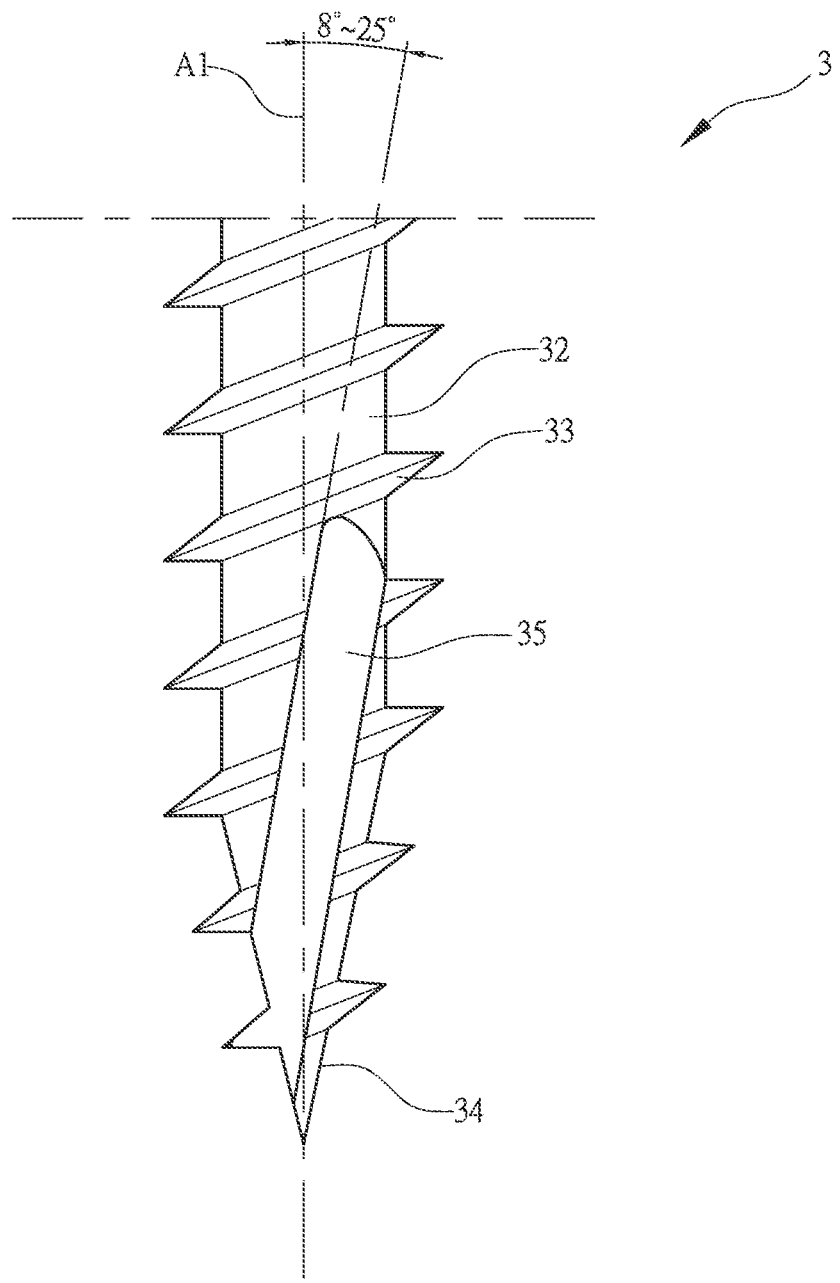
Figure 15B:
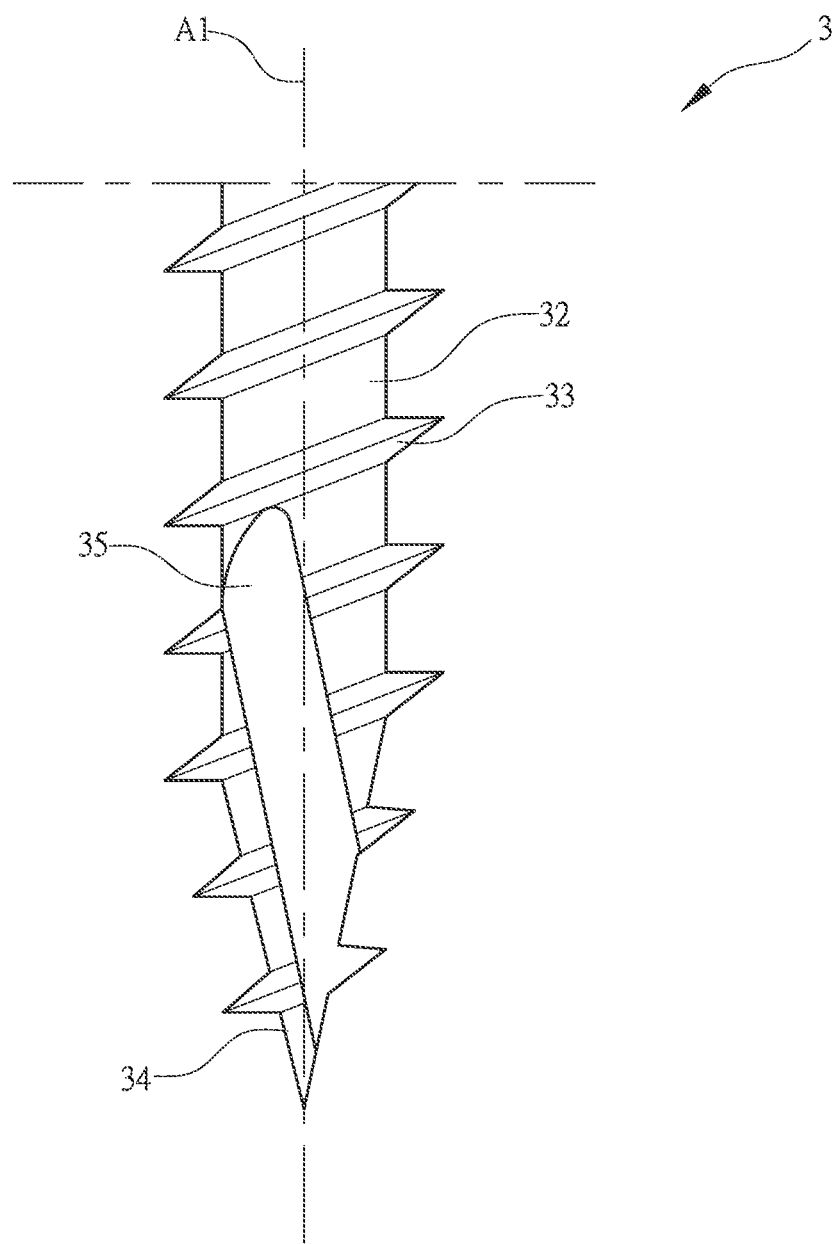

As shown in FIGS. 15 and 15A, a screw 3 comprises a screw head 31. A shank 32 extends downward from the screw head 31. The shank 32 has an outer circumferential surface that is formed, in a surrounding form, with a thread 23. The shank 32 has a lower end that is formed with a tapering tail section 24. The thread 33 is extended to the tapering tail section 34. The tapering tail section 34 is formed, through cutting or pressing, with a chip removal groove 35. The chip removal groove 35 is arranged at an inclination angle towards the right side or the left side. With the tapering tail section 34 being formed with a chip removal groove 35, the chip removal groove 35 is close to the right side of the tapering tail section 34 and exceeds the screw center line A1 of the screw 3 so as to improve the chip removal capability of the screw 3; and, the inclination angle of the chip removal grooves is between 1°-89°, so as also to reduce screw-in torque of the screw 3 to thereby achieve an effect of saving labor and time in conducting an operation and also to prevent the occurrence of defects of wood cracking to enhance the quality of an operation conducted with the screw 3. The chip removal groove 35 is extended as a straight line or helically or helically extending upward in a forward direction or a reverse direction to any point of the thread 33. For a chip removal groove 35 set in a reverse direction, the chip removal groove 35 has an inclination angle of 91°-179° (inclining at 1°-89° in a leftward direction with respect to the screw center line A1), wherein for the chip removal groove 35 being of an inclination angle of 1°-89° in a forward direction, the inclination angle of the chip removal groove 35 is inclined 8°-25° in a rightward direction with respect to the screw center line A1, and the chip removal groove 35 has a width greater than one half of the outside diameter of the thread 33 as a preferred example.

The efficacy of the present invention is that with one of the two or more chip removal grooves 25 being arranged to exceed the screw center line A1 of the screw 2 to form an over-center-line chip removal groove 25a, with one of the two or more chip removal grooves 25 being arranged to exceed the screw center line A1 of the screw 2 to form an over-center-line chip removal groove 25a, the chip removal capability of the screw 2 is improved and the screw-in torque of the screw 2 is reduced to thereby achieve an effect of saving labor and time in conducting an operation, and further, with an arrangement of multiple chip removal grooves 25, the occurrence of defects of wood cracking is prevented to enhance the quality of an operation conducted with the screw 2.

Other efficacy of the present invention is that with the tapering tail section 24 of the screw 2 or a portion of the shank 22 that is adjacent to the tapering tail section 24 being formed, through cutting or pressing, with at least two or more chip removal grooves 25 having an inclination angle of 1°-89° or 91°-179° (inclining at 1°-89° in a leftward direction with respect to the screw center line A1), and the chip removal grooves 25 on the left side are all 0.5 to 4.5 times in width of the rightmost over-center-line chip removal groove 25, or any one of the chip removal grooves 25 on the right side is 0.5 to 4.5 times in width of the leftmost over-center-line chip removal groove 25. As such, on the one hand, engineering of the screw 2 drilling/cutting and screwing into a wooden work piece is made easy and on the other hand, the chip removal capability of the screw 2 is improved and the screw-in torque of the screw 2 is reduced to achieve an effect of saving labor and time in conducting an operation and also to prevent the occurrence of defects of wood cracking to enhance the quality of an operation conducted with the screw 2 so as to enhance overall performance of the screw 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A chip removal structure of a screw, the screw comprising a screw head, a shank extending downward from the screw head, the shank having an outer circumferential surface on which a thread is formed in a surrounding form, the shank having a lower end that is formed with a tapering tail section, the thread being extended to the tapering tail section, wherein the tapering tail section is formed, through cutting or pressing, with two or more chip removal grooves, wherein the plurality of chip removal grooves have an inclination angle of 1°-89° or 91°-179°, wherein the plurality of chip removal grooves are not extended to a bottom of the tapering tail section and are formed on one, same side or two sides of the tapering tail section, and the plurality of chip removal grooves exceed a screw center line of the screw to each form an over-center-line chip removal groove, the chip removal grooves on the left side being 0.5 to 4.5 times in width of a rightmost chip removal groove.

2. The chip removal structure of the screw according to claim 1, wherein the plurality of chip removal grooves are arranged in a reverse direction, with a reverse inclination angle between 91°-179° (as inclining at an angle of 1°-89° in a leftward direction with respect to the screw center line), the chip removal grooves of the right side being 0.5 to 4.5 times in width of a leftmost chip removal groove.

3. The chip removal structure of the screw according to claim 1, wherein in one of the plurality of the chip removal grooves having the inclination angle of 1°-89°, for a case of two chip removal grooves, the inclination angle is preferably of an angle between 13°-30°, the angle being determined according to a width of the over-center-line chip removal groove associated therewith; and for a case of more than three chip removal grooves, the inclination angle is preferably of an angle between 23°-45°.

4. A chip removal structure of a screw, the screw comprising a screw head, a shank extending downward from the screw head, the shank having an outer circumferential surface on which a thread is formed in a surrounding form, the shank having a lower end that is formed with a tapering tail section, wherein the tapering tail section comprises or does not comprise the thread, the tapering tail section or the tapering tail section and a portion of the thread being cut or press from two sides thereof toward a center to form a double-sided cutting tip section in the form of a plate, wherein an upper portion of the double-sided cutting tip section connected to the thread is formed, through cutting or pressing, with at least one chip removal grooves, wherein the chip removal groove has an inclination angle of 1°-89° or 91°-179°, wherein the chip removal groove exceeds a screw center line of the screw to each form an over-center-line chip removal groove, the chip removal grooves on the left side being 0.5 to 4.5 times in width of a rightmost chip removal groove.

5. The chip removal structure of the screw according to claim 4, wherein the plurality of chip removal grooves are arranged in a reverse direction, with a reverse inclination angle between 91°-179° (as inclining at an angle of 1°-89° in a leftward direction with respect to the screw center line), the chip removal grooves of the right side being 0.5 to 4.5 times in width of a leftmost chip removal groove.

6. The chip removal structure of the screw according to claim 4, wherein the screw shank located above the double-sided cutting tip section is formed, through cutting or pressing, with one or more chip removal grooves, the one or more chip removal grooves being formed on one, same side or two sides of the screw shank above the cutting tip section, the one or more chip removal grooves, which are of straight lines or in a helical form, all exceeding the screw center line, or any one thereof exceeding the screw center line.

7. The chip removal structure of the screw according to claim 6, wherein the chip removal grooves are the chip removal grooves that are arranged on one side, or all exceed the screw center line, or any one thereof exceeding the screw center line.

8. The chip removal structure of the screw according to claim 6, wherein the chip removal grooves are helical chip removal grooves that are arranged on one side.

9. The chip removal structure of the screw according to claim 4, wherein in one of the plurality of the chip removal grooves having the inclination angle of 1°-89°, for a case of two chip removal grooves, the inclination angle is preferably of an angle between 13°-30°, the angle being determined according to a width of the over-center-line chip removal groove associated therewith; and for a case of more than three chip removal grooves, the inclination angle is preferably of an angle between 23°-45°.

10. A chip removal structure of a screw, the screw comprising a screw head, a shank extending downward from the screw head, the shank having an outer circumferential surface on which a thread is formed in a surrounding form, the shank having a lower end that is formed with a tapering tail section, wherein the thread is extended to the tapering tail section, the tapering tail section or the tapering tail section and a portion of the thread being cut or pressed from one side thereof toward a center to form a single-sided cutting tip section in the form of a plate or a single-sided tapering tail section plus a portion of the thread, wherein an upper portion of the single-sided cutting tip section connected to the thread is formed, through cutting or pressing, with at least one chip removal grooves, wherein the plurality of chip removal grooves have an inclination angle of 1°-89° or 91°-179°, wherein the plurality of chip removal grooves are not extended to a bottom of the tapering tail section and are formed on one, same side or two sides of the tapering tail section, and the plurality of chip removal grooves exceed a screw center line of the screw to each form an over-center-line chip removal groove, the chip removal grooves on the left side being 0.5 to 4.5 times in width of a rightmost chip removal groove.

11. The chip removal structure of the screw according to claim 10, wherein the plurality of chip removal grooves are arranged in a reverse direction, with a reverse inclination angle between 91°-179° (as inclining at an angle of 1°-89° in a leftward direction with respect to the screw center line), the chip removal grooves of the right side being 0.5 to 4.5 times in width of a leftmost chip removal groove.

12. The chip removal structure of the screw according to claim 10, wherein the plurality of chip removal grooves are formed on one, same side or two sides of the screw shank located above the cutting tip section, the two or more chip removal grooves all exceeding the screw center line of the screw.

13. The chip removal structure of the screw according to claim 10, wherein in one of the plurality of the chip removal grooves having the inclination angle of 1°-89°, for a case of two chip removal grooves, the inclination angle is preferably of an angle between 13°-30°, the angle being determined according to a width of the over-center-line chip removal groove associated therewith; and for a case of more than three chip removal grooves, the inclination angle is preferably of an angle between 23°-45°.

14. A chip removal structure of a screw, the screw comprising screw head, a shank extending downward from the screw head, the shank having an outer circumferential surface on which a thread is formed in a surrounding form, the shank having a lower end that is formed with a tapering tail section, the thread being extended to the tapering tail section, wherein the tapering tail section is formed, through cutting or pressing, with a chip removal groove, the chip removal groove being not extended to a bottom of the tapering tail section, wherein the chip removal groove has an inclination angle between 1°-89°, the inclination angle of the chip removal groove being 8°-25°, the chip removal groove having a width equal to or greater than a radius of an outside diameter of the thread.

* * * * *